United States Patent
Dejneka et al.

(10) Patent No.: US 10,858,281 B2
(45) Date of Patent: *Dec. 8, 2020

(54) FAST ION EXCHANGEABLE GLASSES WITH HIGH INDENTATION THRESHOLD

(71) Applicant: CORNING INCORPORATED, Corning, NY (US)

(72) Inventors: Matthew John Dejneka, Corning, NY (US); John Christopher Mauro, Boalsburg, PA (US)

(73) Assignee: CORNING INCORPORATED, Corning, NY (US)

( * ) Notice: Subject to any disclaimer, the term of this patent is extended or adjusted under 35 U.S.C. 154(b) by 157 days.

This patent is subject to a terminal disclaimer.

(21) Appl. No.: 15/986,402

(22) Filed: May 22, 2018

(65) Prior Publication Data

US 2018/0265400 A1    Sep. 20, 2018

Related U.S. Application Data

(63) Continuation of application No. 14/543,925, filed on Nov. 18, 2014, now Pat. No. 10,000,410.

(60) Provisional application No. 61/909,049, filed on Nov. 26, 2013.

(51) Int. Cl.
  *C03C 4/18*   (2006.01)
  *C03C 21/00*  (2006.01)
  *C03C 3/091*  (2006.01)
  *C03C 3/093*  (2006.01)
  *C03C 3/097*  (2006.01)

(52) U.S. Cl.
  CPC ............. *C03C 4/18* (2013.01); *C03C 3/091* (2013.01); *C03C 3/093* (2013.01); *C03C 3/097* (2013.01); *C03C 21/002* (2013.01); *C03C 2204/00* (2013.01); *Y10T 428/315* (2015.01)

(58) Field of Classification Search
  None
  See application file for complete search history.

(56) References Cited

U.S. PATENT DOCUMENTS

| 3,146,114 | A  | 8/1964  | Kivilghn |
| 3,524,737 | A  | 8/1970  | Doyle et al. |
| 4,726,981 | A  | 2/1988  | Pierson et al. |
| 8,586,492 | B2 | 11/2013 | Barefoot et al. |
| 8,946,103 | B2 * | 2/2015 | Dejneka ........... C03C 3/093 501/66 |
| 8,951,927 | B2 * | 2/2015 | Dejneka ........... C03C 3/093 501/66 |

(Continued)

FOREIGN PATENT DOCUMENTS

JP    2013527115 A    6/2013

OTHER PUBLICATIONS

English Translation of JP2016533522 Office Action dated October 3, 2018; 6 Pages; Japanese Patent Office.

(Continued)

*Primary Examiner* — David Sample

(74) *Attorney, Agent, or Firm* — Kevin M. Johnson

(57) ABSTRACT

Alkali aluminosilicate glasses that are ion exchangeable to high compressive stresses, have fast ion exchange kinetics, and high intrinsic damage resistance. The glasses achieve all of the above desired properties either with only small amounts of $P_2O_5$ (<1 mol %) or without addition of any $P_2O_5$.

19 Claims, 1 Drawing Sheet

(56) References Cited

U.S. PATENT DOCUMENTS

| | | | |
|---|---|---|---|
| 9,517,967 B2* | 12/2016 | Dejneka | C03C 3/093 |
| 9,815,733 B2* | 11/2017 | Dejneka | C03C 3/097 |
| 9,822,032 B2* | 11/2017 | Dejneka | C03C 3/085 |
| 10,000,410 B2* | 6/2018 | Dejneka | C03C 21/002 |
| 10,494,292 B2* | 12/2019 | Dejneka | C03C 3/091 |
| 2008/0286548 A1 | 11/2008 | Ellison et al. | |
| 2010/0291353 A1 | 11/2010 | Dejneka et al. | |
| 2011/0047521 A1 | 2/2011 | Binder et al. | |
| 2011/0201490 A1 | 8/2011 | Barefoot et al. | |
| 2011/0294648 A1 | 12/2011 | Chapman et al. | |
| 2012/0135226 A1 | 5/2012 | Bookbinder et al. | |
| 2012/0277085 A1 | 11/2012 | Bookbinder et al. | |
| 2012/0308827 A1 | 12/2012 | Boek et al. | |
| 2013/0004758 A1 | 1/2013 | Dejneka et al. | |
| 2013/0045375 A1 | 2/2013 | Gross | |
| 2013/0224491 A1 | 8/2013 | Smedskjaer et al. | |
| 2013/0260154 A1 | 10/2013 | Allan et al. | |
| 2014/0106172 A1 | 4/2014 | Dejneka et al. | |

OTHER PUBLICATIONS

Matsuda et al; "Chemical Strengthening and Development of Higher Value Added Strengthened Glasses"; Ceramic Association of Japan; 2013; vol. 48, No. 4; pp. 300-304.

Author Unknown, "Principle of Glass Technology" Edited by Wuhan Institute of Building Materials Industry, China Building Industry Press, Dec. 1981, Edition 1, p. 139-140 (english abstract attached).

English Translation of CN201480074139.9 Office Action dated Jan. 14, 2019, China Patent Office, 10 Pgs.

International Search Report and Written Opinion of the International Searching Authority; PCT/US2014/065928; dated Apr. 22, 2015.

* cited by examiner

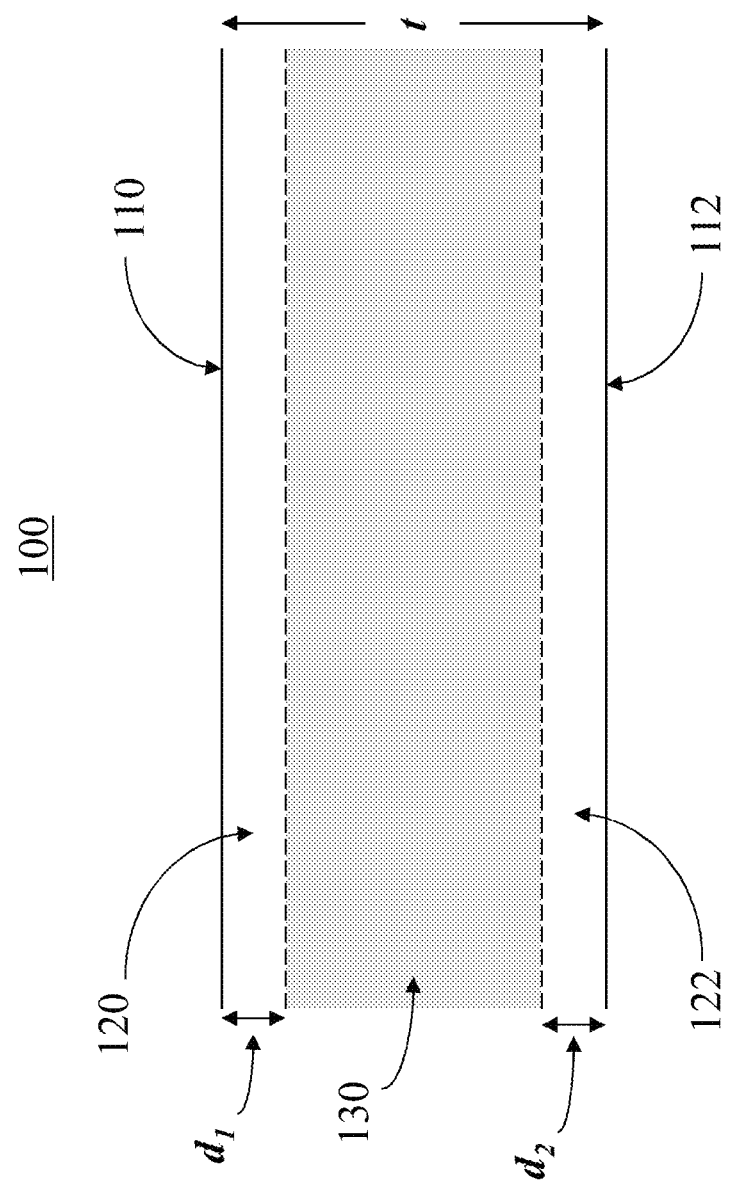

FAST ION EXCHANGEABLE GLASSES WITH HIGH INDENTATION THRESHOLD

CROSS REFERENCE TO RELATED APPLICATIONS

This application is a continuation of U.S. application Ser. No. 14/543,925, Filed Nov. 18, 2014, which claims the benefit of priority to U.S. Provisional Application No. 61/909,049 filed on Nov. 26, 2013.

BACKGROUND

The disclosure relates to alkali aluminosilicate glasses that are ion exchangeable to high compressive stresses, have fast ion exchange kinetics, and high intrinsic damage resistance.

SUMMARY

The present disclosure provides alkali aluminosilicate glasses that are ion exchangeable to high compressive stresses, have fast ion exchange kinetics, and high intrinsic damage resistance. The glasses described herein achieve all of the above desired properties either with only small amounts of $P_2O_5$ (<1 mol %) or without addition of any $P_2O_5$.

Accordingly, one aspect of the disclosure is to provide a glass comprising: from about 50 mol % to about 72 mol % $SiO_2$; from about 12 mol % to about 22 mol % $Al_2O_3$; up to about 6.5 mol % $B_2O_3$; up to about 1 mol % $P_2O_5$; from about 11 mol % to about 21 mol % $Na_2O$; up to about 0.95 mol % $K_2O$; up to about 4 mol % MgO; up to about 5 mol % ZnO; and up to about 2 mol % CaO. In some embodiments, $Na_2O+K_2O-Al_2O_3 \leq 2.0$ mol. In some embodiments, $B_2O_3-(Na_2O+K_2O-Al_2O_3)>1$ mol %. In some embodiments, $B_2O_3-(Na_2O+K_2O-Al_2O_3)>1$ mol %. In some embodiments, 24 mol % $\leq RAlO_4 \leq 45$ mol %, where R is at least one of Na, K, and Ag.

A second aspect of the disclosure is to provide a glass comprising from about 55 mol % to about 62 mol % $SiO_2$; from about 16 mol % to about 20 mol % $Al_2O_3$; from about 4 mol % to about 6.5 mol % $B_2O_3$; from about 14 mol % to about 18 mol % $Na_2O$; from about 0.2 mol % to about 0.75 mol % $K_2O$; up to about 0.5 mol % MgO; up to about 0.5 mol % ZnO; and up to about 0.5 mol % CaO, wherein the glass is substantially free of $P_2O_5$. In some embodiments, $Na_2O+K_2O-Al_2O_3 \leq 0.5$ mol %. In some embodiments, $B_2O_3-(Na_2O+K_2O-Al_2O_3)>4$ mol %. In some embodiments, 28 mol % $\leq RAlO_4 \leq 45$ mol %, where R is at least one of Na, K, and Ag. In some embodiments, the glasses are substantially free of $TiO_2$.

Another aspect is to provide a method of ion exchanging a glass. The method comprises ion exchanging an alkali aluminosilicate glass for up to about eight hours in an ion exchange bath at a temperature of about 410° C. or less. The ion exchange bath comprises a potassium salt and the alkali aluminosilicate glass comprising: from about 50 mol % to about 72 mol % $SiO_2$; from about 12 mol % to about 22 mol % $Al_2O_3$; up to about 6.5 mol % $B_2O_3$; up to about 1 mol % $P_2O_5$; from about 11 mol % to about 21 mol % $Na_2O$; up to about 0.95 mol % $K_2O$; up to about 4 mol % MgO; up to about 5 mol % ZnO; and up to about 1 mol % CaO. The ion exchanged alkali aluminosilicate glass has a compressive layer extending from a surface to a depth of layer DOL, the compressive layer having a compressive stress CS of at least about 500 MPa. In some embodiments, the glasses are substantially free of $TiO_2$.

These and other aspects, advantages, and salient features will become apparent from the following detailed description, the accompanying drawings, and the appended claims.

BRIEF DESCRIPTION OF THE DRAWINGS

FIG. 1 is a schematic cross-sectional view of an ion exchanged glass article.

DETAILED DESCRIPTION

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

As used herein, the terms "glass article" and "glass articles" are used in their broadest sense to include any object made wholly or partly of glass. Unless otherwise specified, all compositions are expressed in terms of mole percent (mol %). Coefficients of thermal expansion (CTE) are expressed in terms of $10^{-7}/°$ C. and represent a value measured over a temperature range from about 20° C. to about 300° C., unless otherwise specified.

As used herein, the term "anneal point," refers to the temperature at which a glass has a viscosity of $10^{13.2}$ poise, the term "strain point" refers to the temperature at which a glass has a viscosity of $10^{14.7}$ poise, and the term "softening point" refers to the temperature at which glass visibly softens under its own weight.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, a glass that is "substantially free of MgO" is one in which MgO is not actively added or batched into the glass, but may be present in very small amounts as a contaminant.

Vickers crack initiation thresholds described herein are determined by applying and then removing an indentation load to the glass surface at a rate of 0.2 mm/min. The maximum indentation load is held for 10 seconds. The indentation cracking threshold is defined at the indentation load at which 50% of 10 indents exhibit any number of radial/median cracks emanating from the corners of the indent impression. The maximum load is increased until the threshold is met for a given glass composition. All indentation measurements are performed at room temperature in 50% relative humidity.

Compressive stress and depth of layer are measured using those means known in the art. Such means include, but are not limited to, measurement of surface stress (FSM) using commercially available instruments such as the FSM-6000, manufactured by Luceo Co., Ltd. (Tokyo, Japan), or the like, and methods of measuring compressive stress and depth of layer are described in ASTM 1422C-99, entitled "Standard Specification for Chemically Strengthened Flat Glass," and ASTM 1279.19779 "Standard Test Method for Non-Destructive Photoelastic Measurement of Edge and Surface Stresses in Annealed, Heat-Strengthened, and Fully-Tempered Flat Glass," the contents of which are incorporated herein by reference in their entirety. Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2008), entitled "Standard Test Method for Measurement of Glass Stress-Optical Coefficient," the contents of which are incorporated herein by reference in their entirety, and a bulk cylinder method.

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

Disclosed herein are alkali aluminosilicate glasses that are ion exchangeable to high compressive stresses, have fast ion exchange kinetics, and high intrinsic damage resistance. Previously, glasses exhibiting all three of these features contain large amounts of $P_2O_5$. The glasses described herein achieve all of the above desired properties either with only small amounts of $P_2O_5$ (<1 mol %) or without addition of any $P_2O_5$.

Ion exchange is commonly used to chemically strengthen glasses. In one particular example, alkali cations within a source of such cations (e.g., a molten salt, or "ion exchange," bath) are exchanged with smaller alkali cations within the glass to achieve a layer that is under a compressive stress (CS) near the surface of the glass. For example, potassium ions from the cation source are often exchanged with sodium ions within the glass. Alternatively, other monovalent cations such as, $Ag^+$, $Cu^+$, $Tl^+$, or the like may be introduced into the glass via such ion exchange. The compressive layer extends from the surface to a depth of layer (DOL) within the glass.

A cross-sectional schematic view of a planar ion exchanged glass article is shown in FIG. 1. Glass article 100 has a thickness t, first surface 110, and second surface 112. While the embodiment shown in FIG. 1 depicts glass article 100 as a flat planar sheet or plate, glass article may have other configurations, such as three dimensional shapes or non-planar configurations. Glass article 100 has a first compressive layer 120 extending from first surface 110 to a depth of layer $d_1$ into the bulk of the glass article 100. In the embodiment shown in FIG. 1, glass article 100 also has a second compressive layer 122 extending from second surface 112 to a second depth of layer $d_2$. Glass article also has a central region 130 that extends from $d_1$ to $d_2$. Central region 130 is under a tensile stress or central tension (CT), which balances or counteracts the compressive stresses of layers 120 and 122. The depth $d_1$, $d_2$ of first and second compressive layers 120, 122 protects the glass article 100 from the propagation of flaws introduced by sharp impact to first and second surfaces 110, 112 of glass article 100, while the compressive stress minimizes the likelihood of a flaw penetrating through the depth $d_1$, $d_2$ of first and second compressive layers 120, 122.

The high amounts of $Al_2O_3$ (12 mol % to 22 mol %) and $Na_2O$ (11 mol % to 21 mol %) in the glasses described herein enable the glass to be ion exchanged to achieve high levels of compressive stress CS. In some embodiments, the glasses described herein may be ion exchanged to produce compressive layers 120, 122 having a compressive stress CS of at least about 500 MPa; in some embodiments, at least about 700 MPa; in other embodiments, at least about 800 MPa; in other embodiments, at least about 900 MPa; in other embodiments, at least about 1000 MPa; and, in still other embodiments, at least about 1100 MPa. In some embodiments, the glasses described herein may be ion exchanged to achieve a compressive stress of at least about 800 MPa and a depth of layer of at least about 52 μm within eight hours ion exchange time. In other embodiments, the glasses described herein may be ion exchanged to achieve a compressive stress of at least about 800 MPa and a depth of layer of at least about 40 μm within four hours ion exchange time. In still other embodiments, the glasses described herein may be ion exchanged to achieve a compressive stress of at least about 800 MPa and a depth of layer of at least about 30 μm within two hours ion exchange time. In some embodiments, the compressive stress is in a range from about 700 MPa to about 1200 MPa; in other embodiments, from about 800 MPa to about 1200 MPa; in still other embodiments, from about 900 MPa to about 1200 MPa.

When ion exchanged, the glasses described herein exhibit intrinsic damage resistance, as reflected by Vickers indentation threshold measurements, described hereinabove. When the value of the expression $B_2O_3-(Na_2O+K_2O-Al_2O_3)$ is high (>1 mol %) and the value of $(Na_2O+K_2O-Al_2O_3)$ is low (≤0.5 mol %), the lass exhibits high levels of damage resistance. In some embodiments, the ion exchanged glass has a Vickers crack indentation threshold of at least about 9.5 kgf; in some embodiments, at least about 17.5 kgf; in other embodiments, at least about 22.5 kgf; in other embodiments, at least about 32.5 kgf; and, in still other embodiments, at least about 40 kgf.

High rates of ion exchange are attributable to the combination of several compositional factors, including high concentrations of $Al_2O_3$ (12 mol % to 22 mol %) and $RAlO_4$ (24 mol % to 45 mol %); a non-zero $K_2O$ concentration (up to about 0.95 mol % $K_2O$); and low concentration (0 mol % to 5 mol %) of divalent metal oxides RO (R' is at least one of Ca. Mg, and Zn). In some embodiments, the glasses described herein are ion exchangeable at a rate to achieve a CS.DOL product of at least 44000 MPa·μm within less than about 8 hours.

The glasses described herein, in some embodiments, have a liquidus viscosity of at least about 100 kiloPoise (kpoise), which enables them to be made using down-draw techniques known in the art, such as fusion draw and slot draw methods. In particular, these glasses are compatible (i.e., do not substantially react with or degrade) with alumina hardware, such as isopipes) used in the fusion draw process.

In some embodiments, the glasses described herein consist essentially of or comprise: from about 50 mol % to about 72 mol % SiO$_2$ (i.e., 50 mol % SiO$_2 \leq$72 mol %); from about 12 mol % to about 22 mol % Al$_2$O$_3$ (i.e., 12 mol %$\leq$Al$_2$O$_3 \leq$22 mol %); up to about 6.5 mol % B$_2$O$_3$ (i.e., 0 mol %=B$_2$O$_3 \leq$6.5 mol %); up to about 1 mol % P$_2$O$_5$ (i.e., 0 mol %$\leq$P$_2$O$_5 \leq$1 mol %); from about 11 mol % to about 21 mol % Na$_2$O (i.e., 11 mol %$\leq$Na$_2$O$\leq$21 mol %); up to about 0.95 mol % K$_2$O (i.e., 0 mol %$\leq$K$_2$O$\leq$0.95 mol %); up to about 4 mol % MgO (i.e., 0 mol %$\leq$MgO$\leq$4 mol %); up to about 5 mol % ZnO (i.e., 0 mol %$\leq$ZnO$\leq$4 mol %); and up to about 2 mol % CaO (i.e., 0 mol %$\leq$CaO$\leq$2 mol %). In some embodiments, Na$_2$O+K$_2$O—Al$_2$O$_3 \leq$2.0 mol % and, in some embodiments, B$_2$O$_3$—(Na$_2$O+K$_2$O—Al$_2$O$_3$)>1 mol %. In some embodiments, 24 mol %$\leq$RAlO$_4 \leq$45 mol %, where R is at least one of Na, K, and Ag. In some embodiments, 56 mol %$\leq$SiO$_2$+B$_2$O$_3 \leq$78 mol % and, in some embodiments, 0 mol %$\leq \Sigma$[R'O]$\leq$5 mol %, where R' is at least one of Ca. Mg, and Zn. In some embodiments, 2 mol %$\leq$B$_2$O$_3$+P$_2$O$_5 \leq$7.5 mol %. In some embodiments, the glasses described herein are substantially free of TiO$_2$.

In certain embodiments, the glass is substantially free of, or contains 0 mol %, P$_2$O$_5$. The glass, in some embodiments, is substantially free of, or contains 0 mol %, Li$_2$O. In some embodiments, the glass is substantially free of As$_2$O$_3$ and Sb$_2$O$_5$.

In some embodiments, the glass may further include at least one fining agent such as SnO$_2$, CeO$_2$, As$_2$O$_3$, Sb$_2$O$_5$, Cl$^-$, F$^-$, or the like. In some embodiments, the glass may include up to about 0.5 mol % SnO$_2$ (i.e., 0 mol %$\leq$SnO$_2 \leq$0.5 mol %); up to about 0.5 mol % Sb$_2$O$_5$, (i.e., 0 mol %$\leq$CeO$_2 \leq$0.5 mol %); and/or up to about 0.5 mol % As$_2$O$_3$ (i.e., 0 mol %$\leq$As$_2$O$_3 \leq$0.5 mol %.

In particular embodiments, the glasses consist essentially of or comprise: from about 55 mol % to about 62 mol % SiO$_2$ (i.e., 55 mol %'SiO$_2 \leq$62 mol %); from about 16 mol % to about 20 mol % Al$_2$O$_3$ (i.e., 16 mol %<Al$_2$O$_3 \leq$20 mol %); from about 2 mol % to about 6.5 mol % B$_2$O$_3$ (i.e., 2 mol % B$_2$O$_3 \leq$6.5 mol %); up to about 1 mol % P$_2$O$_5$ (i.e., 0 mol %$\leq$P$_2$O$_5 \leq$1 mol %); from about 14 mol % to about 18 mol % Na$_2$O (i.e., 14 mol %$\leq$Na$_2$O$\leq$18 mol %); from about 0.2 mol % to about 0.75 mol % K$_2$O (i.e., 0.2 mol %$\leq$K$_2$O$\leq$0.95 mol %); up to about 0.5 mol % MgO (i.e., 0 mol %$\leq$MgO$\leq$0.5 mol %); up to about 0.5 mol % ZnO (i.e., 0 mol %$\leq$ZnO$\leq$0.5 mol %); and up to about 0.5 mol % CaO (i.e., 0 mol %$\leq$CaO$\leq$0.5 mol %). In some embodiments, Na$_2$O+K$_2$O—Al$_2$O$_3 \leq$0.5 mol % and, in some embodiments, B$_2$O$_3$—(Na$_2$O+K$_2$O—Al$_2$O$_3$)>4 mol %. In some embodiments, 24 mol %$\leq$RAlO$_4 \leq$45 mol %, where R is at least one of Na, K, and Ag. In some embodiments, 56 mol %$\leq$SiO$_2$+B$_2$O$_3 \leq$75 mol % and, in some embodiments, 0 mol %$\leq \Sigma$[R'O]$\leq$0.5 mol %, where R' is at least one of Ca. Mg, and Zn. In some embodiments, K$_2$O$\leq$0.5(Na$_2$O+K$_2$O). In embodiments, the glass is substantially free, or contains 0 mol %, of TiO$_2$. In certain embodiments, the glass is substantially free of, or contains 0 mol %, P$_2$O$_5$. The glass, in some embodiments, is substantially free of, or contains 0 mol %, Li$_2$O. In other embodiments, the glass is substantially free, or contains 0 mol %, of As$_2$O$_3$ and Sb$_2$O$_5$.

In embodiments, the glass may further include at least one fining agent such as SnO$_2$, CeO$_2$, As$_2$O$_3$, Sb$_2$O$_5$, Cl$^-$, F$^-$, or the like. In some embodiments, the glass may include up to about 0.5 mol % SnO$_2$ (i.e., 0 mol %$\leq$SnO$_2 \leq$0.5 mol %); up to about 0.5 mol % Sb$_2$O$_5$, (i.e., 0 mol %$\leq$CeO$_2 \leq$0.5 mol %); and/or up to about 0.5 mol % As$_2$O$_3$ (i.e., 0 mol %$\leq$As$_2$O$_3$0.5 mol %.

In still other embodiments, the glasses described herein consist essentially of or comprise: from about 55 mol % to about 62 mol % SiO$_2$ (i.e., 55 mol %$\leq$SiO$_2 \leq$62 mol %); from about 16 mol % to about 20 mol % Al$_2$O$_3$ (i.e., 16 mol %<Al$_2$O$_3 \leq$20 mol %); from about 4 mol % to about 6.5 mol % B$_2$O$_3$ (i.e., 4 mol % B$_2$O$_3 \leq$6.5 mol %); from about 14 mol % to about 18 mol % Na$_2$O (i.e., 14 mol %$\leq$Na$_2$O$\leq$18 mol %); from about 0.2 mol % to about 0.75 mol % K$_2$O (i.e., 0.2 mol %$\leq$K$_2$O$\leq$4 mol %); up to about 0.5 mol % MgO (i.e., 0 mol %$\leq$MgO 0.5 mol %); up to about 0.5 mol % ZnO (i.e., 0 mol %$\leq$ZnO$\leq$0.5 mol %); up to about 0.5 mol % CaO (i.e., 0 mol %$\leq$CaO$\leq$0.5 mol %); and are substantially free of, or contain 0 mol %, P$_2$O$_5$. In some embodiments, Na$_2$O+K$_2$O—Al$_2$O$_3 \leq$0.5 mol % and, in some embodiments, B$_2$O$_3$—(Na$_2$O+K$_2$O—Al$_2$O$_3$)>4 mol %. In some embodiments, 28 mol %$\leq$RAlO$_4 \leq$45 mol %, where R is at least one of Na, K, and Ag. In some embodiments, 56 mol %$\leq$SiO$_2$+B$_2$O$_3 \leq$70 mol % and, in some embodiments, 0 mol %$\leq \Sigma$[R'O]$\leq$0.5 mol %, where R' is at least one of Ca. Mg, and Zn. In some embodiments, K$_2$O$\leq$0.25(Na$_2$O+K$_2$O). In embodiments, the glass is substantially free of TiO$_2$. In certain embodiments, the glass is substantially free of, or contains 0 mol %, Li$_2$O. In some embodiments, the glass is substantially free of, or contains 0 mol %, As$_2$O$_3$ and Sb$_2$O$_5$.

In some embodiments, the glass may further include at least one fining agent such as SnO$_2$, CeO$_2$, As$_2$O$_3$, Sb$_2$O$_5$, Cl$^-$, F$^-$, or the like. In some embodiments, the glass may include up to about 0.5 mol % SnO$_2$ (i.e., 0 mol %$\leq$SnO$_2 \leq$0.5 mol %); up to about 0.5 mol % Sb$_2$O$_5$, (i.e., 0 mol %$\leq$CeO$_2 \leq$0.5 mol %); and/or up to about 0.5 mol % As$_2$O$_3$ (i.e., 0 mol %$\leq$As$_2$O$_3 \leq$0.5 mol %.

Compositions and non-limiting examples of these glasses that comprise P$_2$O$_5$ are listed in Table 1. Compositions and non-limiting examples of these glasses that are substantially free of P$_2$O$_5$ are listed in Table 2. Each of the oxide components of these glasses serves a function. Silica (SiO$_2$), for example, is the primary glass forming oxide, and forms the network backbone for the molten glass. Pure SiO$_2$ has a low CTE and is alkali metal-free. Due to its extremely high melting temperature, however, pure SiO$_2$ is incompatible with the fusion draw process. The viscosity curve is also much too high to match with any core glass in a laminate structure. In some embodiments, the amount of SiO$_2$ in the glasses described herein ranges from about 50 mol % to about 72 mol %. In other embodiments, the SiO$_2$ concentration ranges from about 55 mol % to about 62 mol %.

In addition to silica, the glasses described herein comprise the network formers Al$_2$O$_3$ and B$_2$O$_3$ to achieve stable glass formation, low CTE, low Young's modulus, low shear modulus, and to facilitate melting and/or forming. By mixing all three of these network formers in appropriate concentrations, it is possible achieve stable bulk glass formation while minimizing the need for network modifiers such as alkali or alkaline earth oxides, which act to increase CTE and modulus. Like SiO$_2$, Al$_2$O$_3$ contributes to the rigidity to the glass network. Alumina may exist in the glass in either fourfold or fivefold coordination. In some embodiments, the glasses described herein comprise from about 12 mol % to about 22 mol % Al$_2$O$_3$ and, in particular embodiments, from about 16 mol % to about 20 mol % Al$_2$O$_3$.

Boron oxide (B$_2$O$_3$) is also a glass-forming oxide that is used to reduce viscosity and thus improve the ability to melt and form glass. B$_2$O$_3$ may exist in either threefold or fourfold coordination in the glass network. Threefold coordinated B$_2$O$_3$ is the most effective oxide for reducing the Young's modulus and shear modulus, thus improving the intrinsic damage resistance of the glass. Accordingly, the glasses described herein, in some embodiments, comprise from about 0 mol % up to about 6.5 mol % $B_2O_3$, in other embodiments, from about 2 mol % to about 6.5 mol % $B_2O_3$, and in still other embodiments, from about 4 mol % to about 6.0 mol % $B_2O_3$. In some embodiments, 56 mol %≤$SiO_2$+$B_2O_3$≤78 mol % and, in other embodiments, 66 mol %≤$SiO_2$+$B_2O_3$≤75 mol %. In certain embodiments, $B_2O_3$≤$Al_2O_3$.

The alkali oxides $Na_2O$ and $K_2O$ are used to achieve chemical strengthening of the glass by ion exchange. In some embodiments, the glass includes $Na_2O$, which can be exchanged for potassium in a salt bath containing, for example, $KNO_3$. In some embodiments, 0 mol %≤$K_2O$≤0.95 mol %, and, in certain embodiments, 0.2 mol %≤$K_2O$≤0.75 mol %. In some embodiments, 11 mol %≤$Na_2O$≤21 mol %, in other embodiments, 14 mol %≤$Na_2O$≤18 mol % In other embodiments, 1 mol %≤$Li_2O$≤15 mol %, and, in certain embodiments, 6 mol %≤$Li_2O$≤13 mol %. The glasses described herein are substantially free of $Li_2O$, or comprise 0 mol % $Li_2O$. %). In some embodiments, $Na_2O$+$K_2O$—$Al_2O_3$≤2.0 mol % and, in other embodiments, $Na_2O$+$K_2O$—$Al_2O_3$≤0.5 mol %. In some embodiments, $B_2O_3$—($Na_2O$+$K_2O$—$Al_2O_3$)>1 mol % and, in other embodiments, $B_2O_3$—($Na_2O$+$K_2O$—$Al_2O_3$)>4 mol %. In some embodiments, 24 mol %≤$RAlO_4$≤45 mol %, where R is at least one of Na, K, and Ag, and, in other embodiments, 24 mol %≤$RAlO_4$≤45 mol %, where R is at least one of Na, K, and Ag.

Like $B_2O_3$, alkaline earth oxides such as MgO and CaO, and other divalent oxides such as ZnO also improve the melting behavior of the glass. However, they also act to increase CTE and Young's and shear moduli. In some embodiments, the glasses described herein comprise up to about 4 mol % MgO, up to about 1 mol % CaO, and up to about 4 mol % ZnO. In other embodiments, these glasses may comprise up to about 0.5 mol % MgO, up to about 0.5 mol % CaO, and up to about 0.5 mol % ZnO. In some embodiments, 0 mol %≤Σ[R'O]≤5 mol % and, in other embodiments, 0 mol %≤Σ[R'O]≤0.5 mol %, where R' is at least one of Ca. Mg, and Zn.

$TiO_2$ is commonly used to lower the coefficient of thermal expansion is glasses. However, $TiO_2$ may negatively impact the light transmitting properties of the glass, such as by absorbing and transmitting light that otherwise would not be absorbed or transmitted by the glass. Accordingly, in embodiments, the glass is substantially free of, or contains 0 mol %, $TiO_2$.

In order to ensure that the vast majority of $B_2O_3$ in the glass is in the threefold coordinated state and thereby obtain a high native scratch resistance, $Na_2O$+$K_2O$—$Al_2O_3$≤2.0 mol % and, in some embodiments, $Na_2O$+$K_2O$—$Al_2O_3$≤0.5 mol %. In some embodiments, $B_2O_3$—($Na_2O$+$K_2O$—$Al_2O_3$)>1 mol % and, and, in some embodiments, $B_2O_3$—($Na_2O$+$K_2O$—$Al_2O_3$)>4 mol %.

The glass may also include at least one fining agent such as $SnO_2$, $CeO_2$, $As_2O_3$, $Sb_2O_5$, $Cl^-$, $F^-$, or the like in small concentrations to aid in the elimination of gaseous inclusions during melting. In some embodiments, the glass may comprise up to about 0.5 mol % $SnO_2$, up to about 0.5 mol % $As_2O_3$, and/or up to about 0.5 mol % $Sb_2O_3$. However, $As_2O_3$ and $Sb_2O_3$ may have adverse affects on the environment and health. Therefore, in some embodiments, the glass is substantially free of, or contains 0 mol %, $As_2O_3$ and $Sb_2O_5$.

Non-limiting examples of compositions and their selected physical properties (strain, anneal and softening points, density, CTE, liquidus temperatures, modulus, refractive index, and stress optical coefficient (SOC)) of the glasses described herein comprising up to about 1 mol % $P_2O_5$ are listed in Table 1. Non-limiting examples of compositions and their selected physical properties of the glasses described herein that do not contain $P_2O_5$ are listed in Table 2.

In another aspect, a method of ion exchanging the alkali aluminosilicate glasses described herein above is provided. The method comprises ion exchanging the glass at temperatures of up to about 410° C. for up to about eight hours in an ion exchange bath comprising a potassium salt to form a compressive layer having a compressive stress CS of at least 500 MPa and extending from a surface to a depth of layer DOL. In some embodiments, the glasses described herein may be ion exchanged to achieve a compressive stress of at least about 800 MPa and a depth of layer of at least about 52 μm within eight hours ion exchange time. In other embodiments, the glasses described herein may be ion exchanged to achieve a compressive stress of at least about 800 MPa and a depth of layer of at least about 40 μm within four hours ion exchange time. In still other embodiments, the glasses described herein may be ion exchanged to achieve a compressive stress of at least about 800 MPa and a depth of layer of at least about 30 μm within two hours ion exchange time. In some embodiments, CS.DOL=44000 MPa·μm.

TABLE 1

Compositions and selected physical properties of the glasses described herein comprising up to about 1 mol % $P_2O_5$.

| Glass (mol %) | A | B | C | D | E |
|---|---|---|---|---|---|
| $SiO_2$ | 63.53 | 64.65 | 63.58 | 64.55 | 64.63 |
| $Al_2O_3$ | 14.98 | 14 | 14 | 13.97 | 14.38 |
| $B_2O_3$ | 6.046 | 6.937 | 6.983 | 7.015 | 6.016 |
| $Na_2O$ | 13.76 | 12.74 | 13.75 | 13.73 | 13.76 |
| $K_2O$ | 0.503 | 0.496 | 0.501 | 0.005 | 0.501 |
| MgO | 0.039 | 0.037 | 0.037 | 0.042 | 0.02 |
| CaO | 0.07 | 0.07 | 0.068 | 0.068 | 0.064 |
| ZnO | 0 | 0 | 0 | 0 | 0 |
| $P_2O_5$ | 0.97 | 0.97 | 0.97 | 0.51 | 0.497 |
| $SnO_2$ | 0.1 | 0.1 | 0.101 | 0.099 | 0.099 |
| [$Na_2O$] + [$K_2O$] − [$Al_2O_3$] | −0.71 | −0.76 | 0.242 | −0.23 | −0.12 |
| [$B_2O_3$] − ([$Na_2O$] + [$K_2O$] − [$Al_2O_3$]) | 6.76 | 7.701 | 6.741 | 7.244 | 6.135 |
| Strain Pt. (° C.) | 590 | 575 | 559 | 576 | 570 |
| Anneal Pt. (° C.) | 649 | 634 | 613 | 633 | 629 |
| Soft Pt. (° C.) | 935 | 906 | 879 | 914 | 919 |
| CTE ($10^{7°}$ $C.^{-1}$) | 80.6 | 77.3 | 80.5 | 78 | 80.3 |
| Density (g/cm³) | 2.374 | 2.361 | 2.374 | 2.367 | 2.378 |
| E Mod (Mpsi) | 9.26 | 9.14 | 9.239 | 9.165 | 9.357 |
| G Mod (Mpsi) | 3.816 | 3.764 | 3.788 | 3.778 | 3.864 |
| ν (Poisson's ratio) | 0.213 | 0.214 | 0.219 | 0.213 | 0.211 |
| Indentation Threshold (kgf) | 30 | 27.5 | 25 | 30 | 32.5 |
| CS[1] (MPa) | 803.4 | 724.9 | 733.1 | 782.1 | 792.5 |
| DOL[1] (μm) | 70.09 | 64.23 | 60.75 | 58.71 | 62.94 |

[1]Glass fusion drawn/fictivated and ion exchanged at 410° C. for 8 hours in $KNO_3$ molten salt bath.

TABLE 2

Compositions and selected physical properties of the glasses described herein that do not contain $P_2O_5$.

| Glass (mol %) | 1 | 2 | 3 | 4 | 5 | 6 |
|---|---|---|---|---|---|---|
| $SiO_2$ | 64.05 | 63.98 | 64.02 | 63.96 | 61.44 | 62.02 |
| $Al_2O_3$ | 13.59 | 16.35 | 15.86 | 16.41 | 16.87 | 16.53 |
| $B_2O_3$ | 8.11 | 4.00 | 3.98 | 2.13 | 5.40 | 4.95 |
| $Na_2O$ | 13.54 | 14.40 | 14.87 | 16.25 | 15.59 | 15.99 |
| $K_2O$ | 0.51 | 1.02 | 1.02 | 1.01 | 0.51 | 0.51 |
| MgO | 0.02 | 0.02 | 0.02 | 0.02 | 0.02 | 0.01 |
| CaO | 0.07 | 0.13 | 0.13 | 0.13 | 0.07 | 0.07 |
| ZnO | | | | | | |
| $P_2O_5$ | | | | | | |
| $SnO_2$ | 0.10 | 0.10 | 0.10 | 0.10 | 0.09 | 0.10 |
| $[Na_2O] + [K_2O] - [Al_2O_3]$ | 0.46 | -0.93 | 0.02 | 0.85 | -0.77 | -0.04 |
| $[B_2O_3] - ([Na_2O] + [K_2O] - [Al_2O_3])$ | 7.65 | 4.94 | 3.96 | 1.28 | 6.17 | 4.99 |
| Strain Pt. (° C.) | 542 | 623 | 599 | 620 | 600.8 | 591.3 |
| Anneal Pt. (° C.) | 594 | 684 | 657 | 679 | 659.7 | 649.2 |
| Soft Pt. (° C.) | 856 | 980 | 950 | 969 | 949 | |
| CTE ($10^{7o}$ $C.^{-1}$) | 79 | 84.6 | 86.3 | 89.3 | | |
| Density (g/cm$^3$) | 2.368 | 2.406 | 2.408 | 2.433 | 2.398 | |
| E Mod (Mpsi) | 9.332 | 9.871 | 9.879 | | | |
| G Mod (Mpsi) | 3.807 | 4.044 | 4.042 | | | |
| ν (Poisson's ratio) | 0.226 | 0.221 | 0.222 | | | |
| Indentation Threshold (kgf) | 40 | 17.5 | 17.5 | 11.5 | 42.5 | 27.5 |
| CS (MPa)[1] | | 945.98 | 934.91 | 936.13 | | |
| CS (MPa)[1] (SOC corrected) | | | | | 904.22 | 950.37 |
| DOL (μm)[1] | | 75.87 | 74.66 | 73.94 | 73.65 | 72.07 |
| CS (MPa)[2] | 598.55 | 1025.88 | 1031.55 | 1048.43 | | |
| CS (MPa)[2] (SOC corrected) | | | | | 978.33 | 1069.76 |
| DOL (μm)[2] | 45.97 | 56.41 | 57.43 | 60.06 | 59.41 | 56.14 |

| Glass (mol %) | 7 | 8 | 9 | 10 | 11 | 12 |
|---|---|---|---|---|---|---|
| $SiO_2$ | 58.05 | 59.94 | 62.02 | 61.92 | 64.41 | 66.99 |
| $Al_2O_3$ | 17.66 | 16.49 | 16.53 | 16.85 | 14.95 | 13.31 |
| $B_2O_3$ | 6.08 | 6.63 | 5.03 | 5.04 | 6.04 | 5.79 |
| $Na_2O$ | 17.49 | 16.20 | 15.91 | 15.67 | 13.89 | 13.74 |
| $K_2O$ | 0.50 | 0.51 | 0.51 | 0.51 | 0.52 | 0.01 |
| MgO | 0.02 | 0.02 | 0.01 | 0.02 | 0.02 | 0.02 |
| CaO | 0.08 | 0.08 | 0.07 | 0.08 | 0.06 | 0.02 |
| ZnO | | | | | | |
| $P_2O_5$ | | | | | | |
| $SnO_2$ | 0.10 | 0.10 | 0.09 | 0.10 | 0.10 | 0.10 |
| $[Na_2O] + [K_2O] - [Al_2O_3]$ | 0.33 | 0.22 | -0.11 | -0.66 | -0.55 | 0.44 |
| $[B_2O_3] - ([Na_2O] + [K_2O] - [Al_2O_3])$ | 5.75 | 6.41 | 5.14 | 5.70 | 6.59 | 5.35 |
| Strain Pt. (° C.) | 594 | 588 | 591 | 602.6 | 603 | 594 |
| Anneal Pt. (° C.) | 648 | 644 | 649.4 | 661.4 | 662 | 653 |
| Soft Pt. (° C.) | 907 | 905 | | | 946 | 942 |
| CTE ($10^{7o}$ $C.^{-1}$) | 90.8 | 87.4 | | | 80.4 | 75.3 |
| Density (g/cm$^3$) | 2.412 | 2.399 | | | 2.381 | 2.365 |
| E Mod (Mpsi) | 9.52 | 9.418 | | | 9.438 | 9.309 |
| G Mod (Mpsi) | 3.877 | 3.83 | | | 3.865 | 3.848 |
| ν (Poisson's ratio) | 0.228 | 0.229 | | | 0.221 | 0.21 |
| Indentation Threshold (kgf) | 22.5 | 32.5 | 27.5 | 35 | 50 | 32.5 |
| CS (MPa)[1] | 982.26 | 887.12 | | | 836.34 | 770.78 |
| CS (MPa)[1] (SOC corrected) | | 838.10 | 951.64 | 992.14 | 786.73 | 709.43 |
| DOL (μm)[1] | 71.23 | 70.91 | 70.87 | 69.64 | 69.48 | 69.26 |
| CS (MPa)[2] | 1134.74 | 1090.05 | | | 940.56 | 920.95 |
| CS (MPa)[2] (SOC corrected) | | 1029.81 | | 1033.00 | 884.78 | 847.65 |
| DOL (μm)[2] | 53.67 | 51.20 | | 58.58 | 53.11 | 50.07 |

| Glass (mol %) | 13 | 14 | 15 | 16 | 17 | 18 |
|---|---|---|---|---|---|---|
| $SiO_2$ | 67.14 | 67.11 | 60.31 | 61.66 | 67.08 | 66.96 |
| $Al_2O_3$ | 13.21 | 13.23 | 16.46 | 16.22 | 13.23 | 13.33 |
| $B_2O_3$ | 5.77 | 5.76 | 6.50 | 5.09 | 5.77 | 5.79 |
| $Na_2O$ | 13.42 | 13.42 | 16.04 | 16.33 | 13.46 | 13.75 |
| $K_2O$ | 0.26 | 0.26 | 0.51 | 0.51 | 0.26 | 0.01 |
| MgO | 0.02 | 0.02 | 0.02 | 0.02 | 0.02 | 0.02 |
| CaO | 0.05 | 0.05 | 0.07 | 0.07 | 0.05 | 0.02 |
| ZnO | | | | | | |
| $P_2O_5$ | | | | | | |
| $SnO_2$ | 0.10 | 0.10 | 0.09 | 0.10 | 0.10 | 0.10 |
| $[Na_2O] + [K_2O] - [Al_2O_3]$ | 0.47 | 0.45 | 0.09 | 0.62 | 0.49 | 0.43 |
| $[B_2O_3] - ([Na_2O] + [K_2O] - [Al_2O_3])$ | 5.30 | 5.30 | 6.41 | 4.46 | 5.27 | 5.36 |

TABLE 2-continued

Compositions and selected physical properties of the glasses described herein that do not contain $P_2O_5$.

| | | | | | | |
|---|---|---|---|---|---|---|
| Strain Pt. (° C.) | 593 | 592 | 569.4 | 569.5 | 591 | 594 |
| Anneal Pt. (° C.) | 651 | 650 | 624.4 | 622.9 | 649 | 652 |
| Soft Pt. (° C.) | 931 | 938 | | | 935 | 942 |
| CTE ($10^{7°}$ C.$^{-1}$) | 76.8 | 76.5 | | | 76.3 | 75.6 |
| Density (g/cm³) | 2.369 | 2.37 | 2.396 | 2.408 | 2.368 | 2.369 |
| E Mod (Mpsi) | 9.412 | 9.453 | | | 9.502 | 9.34 |
| G Mod (Mpsi) | 3.873 | 3.865 | | | 3.845 | 3.849 |
| ν (Poisson's ratio) | 0.215 | 0.223 | | | 0.236 | 0.213 |
| Indentation Threshold (kgf) | 27.5 | >25 | 47.5 | 17.5 | 17.5 | 27.5 |
| CS (MPa)¹ | 763.00 | 767.19 | | | 757.38 | 783.96 |
| CS (MPa)¹ (SOC corrected) | 707.18 | 711.69 | 833.11 | 885.94 | 701.16 | 726.19 |
| DOL (μm)¹ | 69.24 | 69.17 | 68.85 | 68.79 | 68.70 | 67.82 |
| CS (MPa)² | 901.59 | 901.02 | | | 899.76 | 928.71 |
| CS (MPa)² (SOC corrected) | 835.64 | 835.84 | 958.06 | 1000.30 | 832.97 | 860.27 |
| DOL (μm)² | 49.25 | 50.41 | 54.45 | 50.89 | 52.33 | 48.49 |

| Glass (mol %) | 19 | 20 | 21 | 22 | 23 | 24 |
|---|---|---|---|---|---|---|
| $SiO_2$ | 62.38 | 67.14 | 65.66 | 62.86 | 57.41 | 56.99 |
| $Al_2O_3$ | 15.71 | 13.23 | 13.71 | 15.30 | 19.20 | 19.12 |
| $B_2O_3$ | 5.05 | 5.72 | 6.26 | 5.14 | 5.33 | 5.44 |
| $Na_2O$ | 16.17 | 13.42 | 13.91 | 16.01 | 17.65 | 17.97 |
| $K_2O$ | 0.51 | 0.26 | 0.26 | 0.51 | 0.25 | 0.26 |
| MgO | 0.02 | 0.02 | 0.02 | 0.02 | 0.02 | 0.05 |
| CaO | 0.06 | 0.05 | 0.05 | 0.06 | 0.04 | 0.06 |
| ZnO | | | | | | 0.00 |
| $P_2O_5$ | | | | | | |
| $SnO_2$ | 0.10 | 0.10 | 0.10 | 0.10 | 0.10 | 0.10 |
| [$Na_2O$] + [$K_2O$] − [$Al_2O_3$] | 0.97 | 0.45 | 0.46 | 1.22 | −1.30 | −0.89 |
| [$B_2O_3$] − ([$Na_2O$] + [$K_2O$] − [$Al_2O_3$]) | 4.08 | 5.26 | 5.80 | 3.92 | 6.63 | 6.33 |
| Strain Pt. (° C.) | 565 | 590 | 586 | 559.6 | 627 | 623 |
| Anneal Pt. (° C.) | 617.1 | 649 | 644 | 610.4 | 683 | 678 |
| Soft Pt. (° C.) | 883.5 | 936 | 928 | | 941 | 928 |
| CTE ($10^{7°}$ C.$^{-1}$) | 86.2 | 76 | 77.6 | | 88.2 | 92.6 |
| Density (g/cm³) | 2.408 | 2.367 | 2.37 | | 2.421 | 2.426 |
| E Mod (Mpsi) | | 9.421 | 9.35 | | 9.705 | 9.603 |
| G Mod (Mpsi) | | 3.858 | 3.828 | | 3.967 | 3.942 |
| ν (Poisson's ratio) | | 0.221 | 0.221 | | 0.223 | 0.218 |
| Indentation Threshold (kgf) | 10 | 32.5 | 22.5 | 10 | 35 | 50 |
| CS (MPa)¹ | | 770.06 | 775.41 | | 1049.21 | 1009.69 |
| CS (MPa)¹ (SOC corrected) | 819.65 | 712.06 | 715.97 | 787.79 | 1029.47 | 999.95 |
| DOL (μm)¹ | 67.18 | 66.93 | 66.93 | 66.49 | 66.43 | 66.37 |
| CS (MPa)² | | 893.63 | 913.97 | | 1211.52 | 1153.86 |
| CS (MPa) (SOC corrected) | 951.03 | 826.33 | 843.91 | 931.00 | 1188.72 | 1142.72 |
| DOL (μm)² | 53.03 | 52.27 | 50.32 | 50.09 | 49.38 | 50.35 |

| Glass (mol %) | 25 | 26 | 27 | 28 | 29 | 30 |
|---|---|---|---|---|---|---|
| $SiO_2$ | 65.34 | 65.86 | 64.11 | 62.89 | 64.06 | 65.45 |
| $Al_2O_3$ | 13.84 | 13.08 | 14.01 | 14.67 | 14.86 | 13.85 |
| $B_2O_3$ | 6.41 | 6.96 | 7.15 | 6.90 | 6.01 | 6.29 |
| $Na_2O$ | 14.24 | 11.72 | 13.03 | 14.31 | 13.81 | 14.23 |
| $K_2O$ | 0.01 | 2.01 | 1.50 | 0.99 | 1.01 | 0.01 |
| MgO | 0.02 | 0.02 | 0.01 | 0.02 | 0.02 | 0.02 |
| CaO | 0.02 | 0.24 | 0.07 | 0.11 | 0.12 | 0.02 |
| ZnO | | | | | | |
| $P_2O_5$ | | | | | | |
| $SnO_2$ | 0.10 | 0.10 | 0.10 | 0.10 | 0.10 | 0.10 |
| [$Na_2O$] + [$K_2O$] − [$Al_2O_3$] | 0.41 | 0.66 | 0.53 | 0.62 | −0.03 | 0.38 |
| [$B_2O_3$] − ([$Na_2O$] + [$K_2O$] − [$Al_2O_3$]) | 6.00 | 6.30 | 6.62 | 6.28 | 6.05 | 5.91 |
| Strain Pt. (° C.) | 589 | 540 | 560 | 548 | 570 | 590 |
| Anneal Pt. (° C.) | 646 | 592 | 613 | 599.9 | 627 | 646 |
| Soft Pt. (° C.) | 928 | 851 | 810 | | 920 | 927 |
| CTE ($10^{7°}$ C.$^{-1}$) | 77.8 | 81.9 | 82.7 | | 82 | 78.5 |
| Density (g/cm³) | 2.371 | 2.379 | 2.382 | 2.385 | 2.388 | 2.372 |
| E Mod (Mpsi) | 9.255 | 9.653 | 9.467 | | 9.635 | 9.286 |
| G Mod (Mpsi) | 3.812 | 3.936 | 3.874 | | 3.913 | 3.846 |
| ν (Poisson's ratio) | 0.214 | 0.226 | 0.222 | | 0.231 | 0.207 |
| Indentation Threshold (kgf) | 27.5 | 17.5 | 47.5 | 37.5 | 47.5 | 37.5 |
| CS (MPa)¹ | 792.17 | 644.93 | 731.96 | | 844.33 | 808.31 |
| CS (MPa)¹ (SOC corrected) | 728.06 | | 688.85 | 734.27 | | 746.13 |
| DOL (μm)¹ | 66.10 | 65.87 | 65.35 | 65.12 | 65.00 | 64.89 |
| CS (MPa)² | 920.31 | 738.35 | 842.29 | | 935.14 | 960.00 |
| CS (MPa)² (SOC corrected) | 845.84 | | 792.68 | 844.88 | | 886.15 |
| DOL (μm)² | 50.82 | 52.26 | 49.62 | 50.30 | 49.86 | 47.59 |

TABLE 2-continued

Compositions and selected physical properties of the glasses described herein that do not contain $P_2O_5$.

| Glass (mol %) | 31 | 32 | 33 | 34 | 35 | 36 |
|---|---|---|---|---|---|---|
| $SiO_2$ | 64.19 | 57.07 | 66.06 | 65.84 | 62.87 | 63.72 |
| $Al_2O_3$ | 15.36 | 18.78 | 13.22 | 13.18 | 14.96 | 14.96 |
| $B_2O_3$ | 5.95 | 5.31 | 6.98 | 6.99 | 6.96 | 7.05 |
| $Na_2O$ | 13.22 | 18.35 | 13.04 | 12.73 | 14.52 | 13.57 |
| $K_2O$ | 1.02 | 0.26 | 0.51 | 1.01 | 0.51 | 0.50 |
| MgO | 0.02 | 0.05 | 0.02 | 0.02 | 0.02 | 0.02 |
| CaO | 0.13 | 0.05 | 0.07 | 0.12 | 0.07 | 0.06 |
| ZnO | | 0.00 | | | | |
| $P_2O_5$ | | | | | | |
| $SnO_2$ | 0.10 | 0.10 | 0.10 | 0.10 | 0.09 | 0.10 |
| $[Na_2O] + [K_2O] - [Al_2O_3]$ | −1.12 | −0.17 | 0.33 | 0.56 | 0.07 | −0.88 |
| $[B_2O_3] - ([Na_2O] + [K_2O] - [Al_2O_3])$ | 7.07 | 5.48 | 6.65 | 6.43 | 6.88 | 7.93 |
| Strain Pt. (° C.) | 586 | 612 | 550 | 545 | 559.9 | 592 |
| Anneal Pt. (° C.) | 646 | 667 | 604 | 598 | 615.7 | 651 |
| Soft Pt. (° C.) | 943 | 921 | 869 | 866 | | 933 |
| CTE ($10^{7°}$ C.$^{-1}$) | 77.7 | 94.2 | 78.4 | 80.1 | | 78.4 |
| Density (g/cm$^3$) | 2.386 | 2.43 | 2.372 | 2.377 | | 2.376 |
| E Mod (Mpsi) | 9.572 | 9.728 | 9.461 | 9.55 | | 9.268 |
| G Mod (Mpsi) | 3.938 | 3.928 | 3.873 | 3.883 | | 3.806 |
| ν (Poisson's ratio) | 0.215 | 0.238 | 0.222 | 0.23 | | 0.218 |
| Indentation Threshold (kgf) | 42.5 | 30 | 17.5 | 17.5 | 42.5 | 50 |
| CS (MPa)[1] | 851.23 | 954.36 | 692.07 | 701.60 | | 809.55 |
| CS (MPa)[1] (SOC corrected) | | 941.04 | | | 779.63 | 759.29 |
| DOL (μm)[1] | 64.72 | 63.88 | 63.57 | 63.16 | 62.91 | 62.89 |
| CS (MPa)[2] | 920.57 | 1152.17 | 814.65 | 810.37 | | 919.37 |
| CS (MPa)[2] (SOC corrected) | | 1136.09 | | | 885.76 | 862.29 |
| DOL (μm)[2] | 45.33 | 51.17 | 48.31 | 46.04 | 47.18 | 47.57 |

| Glass (mol %) | 37 | 38 | 39 | 40 | 41 | 42 |
|---|---|---|---|---|---|---|
| $SiO_2$ | 65.35 | 63.07 | 65.83 | 62.85 | 65.71 | 65.86 |
| $Al_2O_3$ | 14.00 | 15.40 | 13.59 | 15.42 | 13.57 | 13.56 |
| $B_2O_3$ | 6.11 | 6.67 | 5.12 | 7.02 | 5.74 | 5.25 |
| $Na_2O$ | 13.84 | 14.18 | 14.45 | 14.02 | 13.97 | 14.32 |
| $K_2O$ | 0.51 | 0.51 | 0.10 | 0.51 | 0.10 | 0.10 |
| MgO | 0.01 | 0.02 | 0.77 | 0.02 | 0.76 | 0.76 |
| CaO | 0.06 | 0.07 | 0.05 | 0.07 | 0.04 | 0.04 |
| ZnO | | | 0.00 | | 0.00 | 0.00 |
| $P_2O_5$ | | | | | | |
| $SnO_2$ | 0.10 | 0.09 | 0.10 | 0.09 | 0.10 | 0.10 |
| $[Na_2O] + [K_2O] - [Al_2O_3]$ | 0.34 | −0.71 | 0.96 | −0.90 | 0.51 | 0.86 |
| $[B_2O_3] - ([Na_2O] + [K_2O] - [Al_2O_3])$ | 5.76 | 7.38 | 4.16 | 7.92 | 5.24 | 4.40 |
| Strain Pt. (° C.) | 580 | 573.1 | 584 | 575.1 | 586 | 584 |
| Anneal Pt. (° C.) | 636 | 631.6 | 638 | 633.3 | 641 | 639 |
| Soft Pt. (° C.) | 908 | | 907 | | 915 | 911 |
| CTE ($10^{7°}$ C.$^{-1}$) | 79.5 | | 78.5 | | 76.4 | 77.7 |
| Density (g/cm$^3$) | 2.382 | | 2.39 | 2.373 | 2.379 | 2.388 |
| E Mod (Mpsi) | 9.614 | | 9.704 | | 9.558 | 9.609 |
| G Mod (Mpsi) | 3.887 | | 4.007 | | 3.912 | 3.98 |
| ν (Poisson's ratio) | 0.237 | | 0.211 | | 0.222 | 0.207 |
| Indentation Threshold (kgf) | 32.5 | 47.5 | 27.5 | 47.5 | 32.5 | 40 |
| CS (MPa)[1] | 796.55 | | 809.68 | | 803.88 | 811.46 |
| CS (MPa)[1] (SOC corrected) | 749.86 | 780.71 | 784.04 | 800.99 | 764.68 | 778.88 |
| DOL (μm)[1] | 62.80 | 62.50 | 62.42 | 62.41 | 62.01 | 61.95 |
| CS (MPa)[2] | 911.57 | | 1000.28 | | 946.44 | 985.28 |
| CS (MPa)[2] (SOC corrected) | 858.13 | 881.96 | 968.60 | 897.79 | 900.29 | 945.72 |
| DOL (μm)[2] | 47.90 | 47.00 | 44.25 | 46.57 | 49.35 | 45.17 |

| Glass (mol %) | 43 | 44 | 45 | 46 | 47 | 48 |
|---|---|---|---|---|---|---|
| $SiO_2$ | 64.57 | 64.78 | 50.50 | 65.61 | 65.52 | 65.74 |
| $Al_2O_3$ | 13.85 | 13.66 | 21.09 | 13.58 | 13.59 | 13.57 |
| $B_2O_3$ | 7.04 | 7.03 | 7.04 | 5.59 | 5.62 | 5.63 |
| $Na_2O$ | 13.84 | 13.83 | 20.12 | 14.21 | 14.25 | 14.05 |
| $K_2O$ | 0.51 | 0.51 | 0.98 | 0.10 | 0.10 | 0.10 |
| MgO | 0.02 | 0.02 | 0.02 | 0.76 | 0.77 | 0.77 |
| CaO | 0.07 | 0.07 | 0.13 | 0.04 | 0.04 | 0.04 |
| ZnO | | | | 0.00 | 0.00 | 0.00 |
| $P_2O_5$ | | | | | | |
| $SnO_2$ | 0.10 | 0.10 | 0.10 | 0.10 | 0.10 | 0.10 |
| $[Na_2O] + [K_2O] - [Al_2O_3]$ | 0.50 | 0.68 | 0.01 | 0.73 | 0.76 | 0.58 |
| $[B_2O_3] - ([Na_2O] + [K_2O] - [Al_2O_3])$ | 6.54 | 6.35 | 7.03 | 4.86 | 4.85 | 5.05 |

TABLE 2-continued

Compositions and selected physical properties of the glasses described herein that do not contain $P_2O_5$.

| | | | | | | |
|---|---|---|---|---|---|---|
| Strain Pt. (° C.) | 550 | 549.5 | 569 | 581 | 581 | 584 |
| Anneal Pt. (° C.) | 603 | 601.5 | 620 | 637 | 635 | 639 |
| Soft Pt. (° C.) | | 867.5 | 864 | 906 | 906 | 913 |
| CTE ($10^{7o}$ C.$^{-1}$) | 77.7 | 79.3 | 100.9 | 77.6 | 76.7 | 76.6 |
| Density (g/cm$^3$) | 2.38 | 2.373 | 2.444 | 2.385 | 2.384 | 2.382 |
| E Mod (Mpsi) | 9.506 | | 9.669 | 9.663 | 9.608 | 9.651 |
| G Mod (Mpsi) | 3.896 | | 3.906 | 3.948 | 3.942 | 3.92 |
| ν (Poisson's ratio) | 0.22 | | 0.238 | 0.224 | 0.219 | 0.231 |
| Indentation Threshold (kgf) | 37.5 | 37.5 | 12.5 | 37.5 | 32.5 | 40 |
| CS (MPa)$^1$ | 741.35 | | 987.93 | 802.89 | 801.35 | 810.58 |
| CS (MPa)$^1$ (SOC corrected) | | 689.48 | 976.87 | 766.03 | 767.10 | 763.97 |
| DOL (μm)$^1$ | 61.64 | 61.50 | 61.36 | 61.31 | 61.11 | 60.80 |
| CS (MPa)$^2$ | | | 1137.60 | 983.29 | 965.09 | 971.14 |
| CS (MPa)$^2$ (SOC corrected) | | 775.20 | 1124.87 | 938.15 | 923.84 | 915.30 |
| DOL (μm)$^2$ | | 50.44 | 45.76 | 44.62 | 46.39 | 46.48 |

| Glass (mol %) | 49 | 50 | 51 | 52 | 53 | 54 |
|---|---|---|---|---|---|---|
| SiO$_2$ | 65.45 | 56.88 | 64.49 | 59.77 | 64.44 | 56.55 |
| Al$_2$O$_3$ | 13.98 | 18.36 | 14.18 | 16.19 | 13.99 | 18.28 |
| B$_2$O$_3$ | 7.06 | 5.41 | 7.02 | 7.04 | 7.04 | 6.55 |
| Na$_2$O | 12.81 | 18.88 | 13.61 | 16.28 | 13.83 | 17.37 |
| K$_2$O | 0.50 | 0.26 | 0.51 | 0.51 | 0.51 | 0.99 |
| MgO | 0.01 | 0.04 | 0.01 | 0.02 | 0.01 | 0.02 |
| CaO | 0.06 | 0.06 | 0.06 | 0.07 | 0.06 | 0.12 |
| ZnO | | 0.00 | | | 0.00 | |
| P$_2$O$_5$ | | | | | | |
| SnO$_2$ | 0.10 | 0.10 | 0.10 | 0.10 | 0.10 | 0.10 |
| [Na$_2$O] + [K$_2$O] − [Al$_2$O$_3$] | −0.67 | 0.77 | −0.06 | 0.60 | 0.35 | 0.07 |
| [B$_2$O$_3$] − ([Na$_2$O] + [K$_2$O] − [Al$_2$O$_3$]) | 7.73 | 4.64 | 7.08 | 6.44 | 6.69 | 6.47 |
| Strain Pt. (° C.) | 588 | 586 | 578 | 552.1 | 571 | 562 |
| Anneal Pt. (° C.) | 648 | 640 | 634 | 602.8 | 628 | 616 |
| Soft Pt. (° C.) | 943 | 892 | 914 | 858.6 | 887 | 867 |
| CTE ($10^{7o}$ C.$^{-1}$) | 75.4 | 97.2 | 79.5 | | 79 | 93.7 |
| Density (g/cm$^3$) | 2.363 | 2.435 | 2.372 | 2.399 | 2.375 | 2.42 |
| E Mod (Mpsi) | 9.182 | 9.82 | 9.297 | | 9.333 | 9.547 |
| G Mod (Mpsi) | 3.83 | 3.975 | 3.825 | | 3.835 | 3.871 |
| ν (Poisson's ratio) | 0.199 | 0.235 | 0.215 | | 0.217 | 0.233 |
| Indentation Threshold (kgf) | 20 | 12.5 | 37.5 | 42.5 | 37.5 | 27.5 |
| CS (MPa)$^1$ | 754.06 | 907.31 | 795.79 | | 734.76 | 923.25 |
| CS (MPa)$^1$ (SOC corrected) | 691.64 | 904.75 | 741.57 | 789.38 | 679.62 | 899.49 |
| DOL (μm)$^1$ | 60.63 | 60.58 | 60.38 | 60.07 | 59.90 | 59.68 |
| CS (MPa)$^2$ | 865.34 | 1077.34 | 906.33 | | 880.03 | 1042.81 |
| CS (MPa)$^2$ (SOC corrected) | 793.71 | 1074.30 | 844.58 | 930.97 | 813.99 | 1015.97 |
| DOL (μm)$^2$ | 45.17 | 46.13 | 46.55 | 44.63 | 46.09 | 45.26 |

| Glass (mol %) | 55 | 56 | 57 | 58 | 59 | 60 |
|---|---|---|---|---|---|---|
| SiO$_2$ | 57.32 | 63.79 | 67.18 | 64.29 | 55.42 | 56.81 |
| Al$_2$O$_3$ | 19.10 | 14.44 | 12.78 | 13.95 | 18.46 | 18.34 |
| B$_2$O$_3$ | 4.37 | 5.66 | 5.65 | 6.94 | 7.24 | 5.64 |
| Na$_2$O | 17.73 | 15.42 | 13.70 | 14.13 | 18.45 | 18.74 |
| K$_2$O | 0.25 | 0.50 | 0.00 | 0.51 | 0.25 | 0.25 |
| MgO | 1.06 | 0.01 | 0.54 | 0.02 | 0.01 | 0.04 |
| CaO | 0.05 | 0.06 | 0.02 | 0.07 | 0.05 | 0.06 |
| ZnO | | | | | 0.00 | 0.00 |
| P$_2$O$_5$ | | | | | | |
| SnO$_2$ | 0.10 | 0.10 | 0.10 | 0.10 | 0.10 | 0.10 |
| [Na$_2$O] + [K$_2$O] − [Al$_2$O$_3$] | −1.11 | 1.49 | 0.92 | 0.68 | 0.24 | 0.66 |
| [B$_2$O$_3$] − ([Na$_2$O] + [K$_2$O] − [Al$_2$O$_3$]) | 5.48 | 4.17 | 4.73 | 6.25 | 7.00 | 4.98 |
| Strain Pt. (° C.) | 625 | 553.3 | 579 | 550.4 | 569 | 577 |
| Anneal Pt. (° C.) | 678 | 602.1 | 633 | 602.9 | 621 | 630 |
| Soft Pt. (° C.) | 934 | | 904 | 870.7 | 858 | 893 |
| CTE ($10^{7o}$ C.$^{-1}$) | 88.7 | | 75.5 | 79.4 | 94.3 | 95.6 |
| Density (g/cm$^3$) | 2.438 | | 2.376 | 2.375 | 2.424 | 2.434 |
| E Mod (Mpsi) | 9.855 | | 9.547 | | 9.57 | 9.703 |
| G Mod (Mpsi) | 4.018 | | 3.925 | | 3.864 | 3.98 |
| ν (Poisson's ratio) | 0.227 | | 0.216 | | 0.238 | 0.219 |
| Indentation Threshold (kgf) | 15 | 10 | 17.5 | 37.5 | 32.5 | 12.5 |
| CS (MPa)$^1$ | 1087.72 | | 747.21 | | 936.43 | 913.84 |
| CS (MPa)$^1$ (SOC corrected) | 1097.38 | 745.92 | | 718.15 | | 910.69 |
| DOL (μm)$^1$ | 59.34 | 59.32 | 58.98 | 58.69 | 58.60 | 58.58 |
| CS (MPa)$^2$ | 1214.15 | | 910.00 | | 1081.85 | |
| CS (MPa)$^2$ (SOC corrected) | 1224.94 | 899.51 | | 805.33 | | |
| DOL (μm)$^2$ | 45.38 | 44.62 | 42.89 | 47.80 | 45.12 | |

TABLE 2-continued

Compositions and selected physical properties of the glasses described herein that do not contain $P_2O_5$.

| Glass (mol %) | 61 | 62 | 63 | 64 | 65 | 66 |
|---|---|---|---|---|---|---|
| $SiO_2$ | 64.36 | 61.56 | 63.81 | 64.14 | 64.42 | 57.15 |
| $Al_2O_3$ | 14.49 | 15.77 | 14.64 | 14.77 | 13.94 | 18.43 |
| $B_2O_3$ | 7.10 | 6.04 | 5.13 | 7.25 | 8.06 | 5.27 |
| $Na_2O$ | 13.85 | 15.91 | 15.74 | 13.51 | 12.87 | 18.97 |
| $K_2O$ | 0.01 | 0.52 | 0.50 | 0.20 | 0.52 | 0.01 |
| MgO | 0.01 | 0.02 | 0.02 | 0.01 | 0.01 | 0.05 |
| CaO | 0.06 | 0.08 | 0.06 | 0.03 | 0.06 | 0.02 |
| ZnO | | | | 0.00 | | |
| $P_2O_5$ | | | | | | |
| $SnO_2$ | 0.10 | 0.10 | 0.10 | 0.07 | 0.10 | 0.09 |
| $[Na_2O] + [K_2O] - [Al_2O_3]$ | -0.63 | 0.66 | 1.60 | -1.06 | -0.55 | 0.55 |
| $[B_2O_3] - ([Na_2O] + [K_2O] - [Al_2O_3])$ | 7.73 | 5.38 | 3.53 | 8.31 | 8.61 | 4.72 |
| Strain Pt. (° C.) | 591 | 565 | 553.8 | 590 | 574 | 580.2195 |
| Anneal Pt. (° C.) | 650 | 617 | 602.8 | 648 | 631 | 633.1365 |
| Soft Pt. (° C.) | 934 | 888 | 850 | 934 | 916 | |
| CTE ($10^{7°}$ C.$^{-1}$) | 76.6 | 88 | | 75.4 | 75.2 | |
| Density (g/cm$^3$) | 2.37 | 2.411 | 2.408 | 2.368 | 2.36 | |
| E Mod (Mpsi) | 9.315 | 9.563 | | 9.257 | 9.148 | |
| G Mod (Mpsi) | 3.758 | 3.919 | | 3.803 | 3.742 | |
| ν (Poisson's ratio) | 0.239 | 0.22 | | 0.217 | 0.222 | |
| Indentation Threshold (kgf) | 42.5 | 12.5 | 10 | 37.5 | 20 | 12.5 |
| CS (MPa)$^1$ | 807.46 | 926.79 | | 790.43 | 743.00 | 971.44 |
| CS (MPa)$^1$ (SOC corrected) | 731.13 | | 758.52 | 718.78 | 660.54 | 965.67 |
| DOL (μm)$^1$ | 58.50 | 58.25 | 57.92 | 57.90 | 57.68 | 57.60 |
| CS (MPa)$^2$ | 917.91 | 1054.95 | | 930.21 | 849.33 | 1097.45 |
| CS (MPa)$^2$ (SOC corrected) | 831.14 | | 893.72 | 845.89 | 755.07 | 1090.93 |
| DOL (μm)$^2$ | 43.65 | 44.97 | 46.87 | 43.69 | 43.40 | 45.43 |

| Glass (mol %) | 67 | 68 | 69 | 70 | 71 | 72 |
|---|---|---|---|---|---|---|
| $SiO_2$ | 56.23 | 64.65 | 62.83 | 59.76 | 58.19 | 56.21 |
| $Al_2O_3$ | 17.64 | 13.94 | 14.92 | 17.11 | 17.20 | 18.31 |
| $B_2O_3$ | 8.05 | 6.98 | 6.94 | 5.40 | 7.06 | 6.14 |
| $Na_2O$ | 16.78 | 14.20 | 14.63 | 17.54 | 16.29 | 18.87 |
| $K_2O$ | 0.99 | 0.10 | 0.51 | 0.02 | 0.99 | 0.26 |
| MgO | 0.05 | 0.01 | 0.01 | 0.05 | 0.02 | 0.05 |
| CaO | 0.14 | 0.02 | 0.06 | 0.03 | 0.12 | 0.06 |
| ZnO | | 0.00 | | | | 0.00 |
| $P_2O_5$ | | | | | | |
| $SnO_2$ | 0.10 | 0.07 | 0.09 | 0.10 | 0.10 | 0.10 |
| $[Na_2O] + [K_2O] - [Al_2O_3]$ | 0.13 | 0.36 | 0.22 | 0.45 | 0.08 | 0.83 |
| $[B_2O_3] - ([Na_2O] + [K_2O] - [Al_2O_3])$ | 7.92 | 6.62 | 6.72 | 4.95 | 6.98 | 5.31 |
| Strain Pt. (° C.) | 557 | 571 | 558.9 | 579.1148 | 557 | 572 |
| Anneal Pt. (° C.) | 608 | 622 | 613.1 | 631.8197 | 610 | 622 |
| Soft Pt. (° C.) | 850 | 885 | | | 866 | 864 |
| CTE ($10^{7°}$ C.$^{-1}$) | 92 | 79.7 | | | 90.5 | 95.1 |
| Density (g/cm$^3$) | 2.411 | 2.375 | | | 2.41 | 2.432 |
| E Mod (Mpsi) | 9.405 | 9.368 | | | 9.489 | 9.695 |
| G Mod (Mpsi) | 3.83 | 3.814 | | | 3.877 | 3.946 |
| ν (Poisson's ratio) | 0.228 | 0.228 | | | 0.224 | 0.228 |
| Indentation Threshold (kgf) | 25 | 42.5 | 37.5 | 27.5 | 40 | 15 |
| CS (MPa)$^1$ | 859.86 | 804.16 | | 929.92 | 885.30 | 905.74 |
| CS (MPa)$^1$ (SOC corrected) | 819.03 | | 798.84 | 914.11 | 848.48 | 889.52 |
| DOL (μm)$^1$ | 57.60 | 57.38 | 57.26 | 57.20 | 57.11 | 56.82 |
| CS (MPa)$^2$ | 1035.22 | 950.12 | | 1059.78 | 989.53 | 1074.72 |
| CS (MPa)$^2$ (SOC corrected) | 986.07 | | 902.29 | 1041.76 | 948.37 | 1055.47 |
| DOL (μm)$^2$ | 44.40 | 44.00 | 42.70 | 45.24 | 47.57 | 44.47 |

| Glass (mol %) | 73 | 74 | 75 | 76 | 77 | 78 |
|---|---|---|---|---|---|---|
| $SiO_2$ | 65.76 | 64.18 | 64.53 | 65.77 | 57.42 | 61.99 |
| $Al_2O_3$ | 13.87 | 14.01 | 13.99 | 13.21 | 18.59 | 14.65 |
| $B_2O_3$ | 5.15 | 6.23 | 6.60 | 7.04 | 5.35 | 6.05 |
| $Na_2O$ | 13.91 | 13.90 | 13.71 | 13.84 | 17.17 | 14.67 |
| $K_2O$ | 0.11 | 1.49 | 0.50 | 0.01 | 0.26 | 0.52 |
| MgO | 1.08 | 0.01 | 0.49 | 0.01 | 1.06 | 0.02 |
| CaO | 0.03 | 0.06 | 0.06 | 0.01 | 0.05 | 0.08 |
| ZnO | | | 0.00 | | | |
| $P_2O_5$ | | | | | | |
| $SnO_2$ | 0.07 | 0.10 | 0.10 | 0.10 | 0.10 | 0.10 |
| $[Na_2O] + [K_2O] - [Al_2O_3]$ | 0.15 | 1.38 | 0.22 | 0.65 | -1.16 | 0.55 |
| $[B_2O_3] - ([Na_2O] + [K_2O] - [Al_2O_3])$ | 5.00 | 4.86 | 6.38 | 6.40 | 6.51 | 5.50 |

TABLE 2-continued

Compositions and selected physical properties of the glasses described herein that do not contain $P_2O_5$.

| | | | | | | |
|---|---|---|---|---|---|---|
| Strain Pt. (° C.) | 589 | 557 | 570 | 553 | 607 | 610 |
| Anneal Pt. (° C.) | 644 | 607 | 623 | 606 | 661 | 666 |
| Soft Pt. (° C.) | 918 | 847 | 890 | 873 | 917 | 919 |
| CTE ($10^{7°}$ C.$^{-1}$) | 77.2 | 84.2 | 80.4 | 77.2 | 86.8 | 80.5 |
| Density (g/cm$^3$) | 2.389 | 2.402 | 2.383 | 2.375 | 2.429 | 2.44 |
| E Mod (Mpsi) | 9.675 | 9.809 | 9.457 | 9.477 | 10.009 | 9.805 |
| G Mod (Mpsi) | 3.993 | 4.044 | 3.891 | 3.87 | 4.1 | 3.983 |
| ν (Poisson's ratio) | 0.212 | 0.213 | 0.215 | 0.225 | 0.221 | 0.231 |
| Indentation Threshold (kgf) | 50 | 27.5 | 32.5 | 22.5 | >25 | 13.75 |
| CS (MPa)$^1$ | 827.18 | 722.71 | 765.12 | 735.80 | 1042.17 | 928.11 |
| CS (MPa)$^1$ (SOC corrected) | 789.68 | 701.96 | 718.79 | | 1030.82 | |
| DOL (μm)$^1$ | 56.82 | 56.75 | 56.73 | 56.65 | 56.63 | 56.53 |
| CS (MPa)$^2$ | 978.88 | 863.59 | 897.56 | 843.06 | 1188.56 | 1121.22 |
| CS (MPa)$^2$ (SOC corrected) | 934.50 | 838.80 | 843.20 | | 1175.63 | |
| DOL (μm)$^2$ | 42.65 | 46.22 | 44.17 | 42.42 | 43.49 | 41.84 |

| Glass (mol %) | 79 | 80 | 81 | 82 | 83 | 84 |
|---|---|---|---|---|---|---|
| $SiO_2$ | 54.37 | 62.36 | 64.29 | 60.92 | 60.08 | 64.56 |
| $Al_2O_3$ | 19.19 | 15.59 | 13.95 | 16.47 | 16.62 | 13.90 |
| $B_2O_3$ | 6.98 | 5.79 | 7.65 | 5.83 | 6.34 | 7.03 |
| $Na_2O$ | 18.19 | 16.07 | 13.90 | 16.40 | 16.80 | 14.31 |
| $K_2O$ | 0.99 | 0.03 | 0.01 | 0.07 | 0.07 | 0.01 |
| MgO | 0.02 | 0.04 | 0.01 | 0.29 | 0.08 | 0.01 |
| CaO | 0.12 | 0.02 | 0.06 | 0.03 | 0.03 | 0.06 |
| ZnO | | | | | | |
| $P_2O_5$ | | | | | | |
| $SnO_2$ | 0.10 | 0.10 | 0.10 | 0.08 | 0.08 | 0.10 |
| [$Na_2O$] + [$K_2O$] − [$Al_2O_3$] | 0.00 | 0.50 | −0.04 | 0.00 | 0.25 | 0.41 |
| [$B_2O_3$] − ([$Na_2O$] + [$K_2O$] − [$Al_2O_3$]) | 6.99 | 5.29 | 7.69 | 5.83 | 6.09 | 6.62 |
| Strain Pt. (° C.) | 561 | 571.5756 | 572 | 573.7447 | 564.3761 | 574 |
| Anneal Pt. (° C.) | 613 | 623.9441 | 629 | 628.2527 | 618.0616 | 627 |
| Soft Pt. (° C.) | 862 | | 899 | | | 891 |
| CTE ($10^{7°}$ C.$^{-1}$) | 96.2 | | 78.5 | | | 78.9 |
| Density (g/cm$^3$) | 2.428 | | 2.367 | | | 2.378 |
| E Mod (Mpsi) | 9.573 | | 9.288 | | | 9.373 |
| G Mod (Mpsi) | 3.896 | | 3.752 | | | 3.832 |
| ν (Poisson's ratio) | 0.229 | | 0.238 | | | 0.223 |
| Indentation Threshold (kgf) | 25 | 37.5 | 32.5 | 42.5 | 37.5 | 42.5 |
| CS (MPa)$^1$ | 948.59 | 878.64 | 774.46 | | | 782.10 |
| CS (MPa)$^1$ (SOC corrected) | 929.87 | 852.11 | 696.88 | 903.79 | 853.09 | 723.20 |
| DOL (μm)$^1$ | 56.43 | 55.87 | 55.70 | 55.34 | 55.27 | 55.22 |
| CS (MPa)$^2$ | 1072.69 | 992.79 | 903.52 | | | 918.78 |
| CS (MPa)$^2$ (SOC corrected) | 1051.53 | 962.82 | 813.01 | 1004.83 | 974.01 | 849.58 |
| DOL (μm)$^2$ | 47.43 | 43.98 | 42.06 | 43.04 | 44.03 | 41.80 |

| Glass (mol %) | 79 | 80 | 81 | 82 | 83 | 84 |
|---|---|---|---|---|---|---|
| $SiO_2$ | 54.37 | 62.36 | 64.29 | 60.92 | 60.08 | 64.56 |
| $Al_2O_3$ | 19.19 | 15.59 | 13.95 | 16.47 | 16.62 | 13.90 |
| $B_2O_3$ | 6.98 | 5.79 | 7.65 | 5.83 | 6.34 | 7.03 |
| $Na_2O$ | 18.19 | 16.07 | 13.90 | 16.40 | 16.80 | 14.31 |
| $K_2O$ | 0.99 | 0.03 | 0.01 | 0.07 | 0.07 | 0.01 |
| MgO | 0.02 | 0.04 | 0.01 | 0.29 | 0.08 | 0.01 |
| CaO | 0.12 | 0.02 | 0.06 | 0.03 | 0.03 | 0.06 |
| ZnO | | | | | | |
| $P_2O_5$ | | | | | | |
| $SnO_2$ | 0.10 | 0.10 | 0.10 | 0.08 | 0.08 | 0.10 |
| [$Na_2O$] + [$K_2O$] − [$Al_2O_3$] | 0.00 | 0.50 | −0.04 | 0.00 | 0.25 | 0.41 |
| [$B_2O_3$] − ([$Na_2O$] + [$K_2O$] − [$Al_2O_3$]) | 6.99 | 5.29 | 7.69 | 5.83 | 6.09 | 6.62 |
| Strain Pt. (° C.) | 561 | 571.5756 | 572 | 573.7447 | 564.3761 | 574 |
| Anneal Pt. (° C.) | 613 | 623.9441 | 629 | 628.2527 | 618.0616 | 627 |
| Soft Pt. (° C.) | 862 | | 899 | | | 891 |
| CTE ($10^{7°}$ C.$^{-1}$) | 96.2 | | 78.5 | | | 78.9 |
| Density (g/cm$^3$) | 2.428 | | 2.367 | | | 2.378 |
| E Mod (Mpsi) | 9.573 | | 9.288 | | | 9.373 |
| G Mod (Mpsi) | 3.896 | | 3.752 | | | 3.832 |
| ν (Poisson's ratio) | 0.229 | | 0.238 | | | 0.223 |
| Indentation Threshold (kgf) | 25 | 37.5 | 32.5 | 42.5 | 37.5 | 42.5 |
| CS (MPa)$^1$ | 948.59 | 878.64 | 774.46 | | | 782.10 |
| CS (MPa)$^1$ (SOC corrected) | 929.87 | 852.11 | 696.88 | 903.79 | 853.09 | 723.20 |
| DOL (μm)$^1$ | 56.43 | 55.87 | 55.70 | 55.34 | 55.27 | 55.22 |
| CS (MPa)$^2$ | 1072.69 | 992.79 | 903.52 | | | 918.78 |
| CS (MPa)$^2$ (SOC corrected) | 1051.53 | 962.82 | 813.01 | 1004.83 | 974.01 | 849.58 |
| DOL (μm)$^2$ | 47.43 | 43.98 | 42.06 | 43.04 | 44.03 | 41.80 |

TABLE 2-continued

Compositions and selected physical properties of the glasses described herein that do not contain $P_2O_5$.

| Glass (mol %) | 85 | 86 | 87 | 88 | 89 | 90 |
|---|---|---|---|---|---|---|
| $SiO_2$ | 55.11 | 64.31 | 64.34 | 64.34 | 65.71 | 63.41 |
| $Al_2O_3$ | 18.41 | 13.68 | 14.72 | 14.00 | 13.90 | 13.96 |
| $B_2O_3$ | 7.58 | 7.01 | 6.18 | 5.99 | 5.15 | 7.07 |
| $Na_2O$ | 18.47 | 14.29 | 13.43 | 14.06 | 13.42 | 13.89 |
| $K_2O$ | 0.25 | 0.50 | 0.20 | 0.51 | 0.11 | 1.49 |
| MgO | 0.01 | 0.02 | 1.01 | 0.01 | 1.60 | 0.01 |
| CaO | 0.04 | 0.06 | 0.02 | 0.06 | 0.04 | 0.06 |
| ZnO | 0.00 | | 0.00 | 0.91 | | |
| $P_2O_5$ | | | | | | |
| $SnO_2$ | 0.10 | 0.10 | 0.07 | 0.10 | 0.07 | 0.10 |
| $[Na_2O] + [K_2O] - [Al_2O_3]$ | 0.31 | 1.11 | -1.09 | 0.57 | -0.37 | 1.42 |
| $[B_2O_3] - ([Na_2O] + [K_2O] - [Al_2O_3])$ | 7.28 | 5.90 | 7.28 | 5.42 | 5.52 | 5.65 |
| Strain Pt. (° C.) | 562 | 545.1 | 596 | 568 | 594 | 549 |
| Anneal Pt. (° C.) | 611 | 594.9 | 653 | 623 | 649 | 596 |
| Soft Pt. (° C.) | 857 | | 929 | 890 | 928 | 823 |
| CTE ($10^{7o}$ $C.^{-1}$) | 93.2 | | 76 | 79.8 | 75.1 | 86.2 |
| Density (g/cm³) | 2.421 | | 2.381 | 2.404 | 2.388 | 2.4 |
| E Mod (Mpsi) | 9.468 | | 9.593 | 9.576 | 10.005 | 9.712 |
| G Mod (Mpsi) | 3.846 | | 3.91 | 3.952 | 4.123 | 3.993 |
| ν (Poisson's ratio) | 0.231 | | 0.227 | 0.211 | 0.213 | 0.216 |
| Indentation Threshold (kgf) | 27.5 | 27.5 | 32.5 | 32.5 | 42.5 | 27.5 |
| CS (MPa)[1] | 871.28 | | 824.73 | 807.70 | 826.35 | 741.59 |
| CS (MPa)[1] (SOC corrected) | | 715.55 | 773.18 | 782.00 | 788.89 | 717.44 |
| DOL (μm)[1] | 55.06 | 55.00 | 54.74 | 54.74 | 54.51 | 54.45 |
| CS (MPa)[2] | 1067.00 | | 960.72 | 950.41 | 961.11 | 847.99 |
| CS (MPa)[2] (SOC corrected) | | 855.74 | 900.68 | 920.17 | 917.54 | 820.39 |
| DOL (μm)[2] | 43.78 | 41.97 | 41.27 | 41.71 | 40.97 | 41.98 |

| Glass (mol %) | 91 | 92 | 93 | 94 | 95 | 96 |
|---|---|---|---|---|---|---|
| $SiO_2$ | 60.04 | 64.59 | 61.91 | 64.26 | 64.77 | 70.65 |
| $Al_2O_3$ | 16.54 | 13.88 | 13.94 | 13.96 | 13.87 | 12.35 |
| $B_2O_3$ | 6.43 | 7.02 | 6.07 | 7.14 | 6.51 | 3.95 |
| $Na_2O$ | 16.71 | 13.80 | 15.46 | 13.93 | 14.14 | 12.35 |
| $K_2O$ | 0.07 | 0.50 | 0.52 | 0.52 | 0.52 | 0.51 |
| MgO | 0.11 | 0.02 | 0.02 | 0.01 | 0.01 | 0.02 |
| CaO | 0.03 | 0.06 | 0.08 | 0.06 | 0.06 | 0.07 |
| ZnO | | | | | | |
| $P_2O_5$ | | | | | | |
| $SnO_2$ | 0.07 | 0.10 | 0.10 | 0.10 | 0.10 | 0.10 |
| $[Na_2O] + [K_2O] - [Al_2O_3]$ | 0.24 | 0.41 | 2.03 | 0.49 | 0.78 | 0.51 |
| $[B_2O_3] - ([Na_2O] + [K_2O] - [Al_2O_3])$ | 6.19 | 6.61 | 4.04 | 6.65 | 5.73 | 3.44 |
| Strain Pt. (° C.) | 566.277 | 557 | 593 | 565 | 567 | 582 |
| Anneal Pt. (° C.) | 619.0794 | 610 | 646 | 617 | 617 | 640 |
| Soft Pt. (° C.) | 879 | 883 | 885 | 874 | 869 | 949 |
| CTE ($10^{7o}$ $C.^{-1}$) | 89.1 | 79.4 | 84.4 | 81 | 80.5 | 71.2 |
| Density (g/cm³) | 2.399 | 2.379 | 2.449 | 2.379 | 2.388 | 2.374 |
| E Mod (Mpsi) | 9.607 | 9.451 | 9.842 | 9.443 | 9.531 | 9.784 |
| G Mod (Mpsi) | 3.925 | 3.864 | 4.02 | 3.858 | 3.941 | 4.047 |
| ν (Poisson's ratio) | 0.224 | 0.223 | 0.224 | 0.224 | 0.209 | 0.209 |
| Indentation Threshold (kgf) | 37.5 | 35 | 11.75 | 42.5 | 37.5 | 22.5 |
| CS (MPa)[1] | | 782.47 | 931.17 | 786.03 | 782.17 | 754.58 |
| CS (MPa)[1] (SOC corrected) | 853.81 | 724.59 | | 737.12 | 749.86 | |
| DOL (μm)[1] | 54.45 | 54.33 | 54.21 | 54.15 | 54.02 | 53.97 |
| CS (MPa)[2] | | 871.70 | 1147.76 | 889.71 | 888.55 | 861.31 |
| CS (MPa)[2] (SOC corrected) | 971.19 | 807.23 | | 834.35 | 851.85 | |
| DOL (μm)[2] | 43.91 | 41.57 | 39.13 | 44.73 | 42.96 | 49.11 |

| Glass (mol %) | 97 | 98 | 99 | 100 | 101 | 102 |
|---|---|---|---|---|---|---|
| $SiO_2$ | 64.32 | 62.77 | 64.75 | 59.99 | 54.58 | 64.48 |
| $Al_2O_3$ | 14.00 | 14.55 | 13.91 | 16.55 | 18.38 | 14.03 |
| $B_2O_3$ | 6.15 | 7.11 | 7.14 | 6.44 | 8.14 | 5.97 |
| $Na_2O$ | 13.82 | 14.87 | 13.99 | 16.85 | 18.47 | 13.81 |
| $K_2O$ | 0.51 | 0.51 | 0.01 | 0.07 | 0.26 | 0.50 |
| MgO | 1.01 | 0.03 | 0.01 | 0.07 | 0.01 | 1.03 |
| CaO | 0.06 | 0.07 | 0.06 | 0.03 | 0.05 | 0.07 |
| ZnO | 0.00 | | | | 0.00 | |
| $P_2O_5$ | | | | | | |
| $SnO_2$ | 0.10 | 0.09 | 0.10 | 0.08 | 0.10 | 0.10 |
| $[Na_2O] + [K_2O] - [Al_2O_3]$ | 0.33 | 0.82 | 0.09 | 0.37 | 0.34 | 0.27 |
| $[B_2O_3] - ([Na_2O] + [K_2O] - [Al_2O_3])$ | 5.83 | 6.29 | 7.05 | 6.07 | 7.80 | 5.70 |

TABLE 2-continued

Compositions and selected physical properties of the glasses described herein that do not contain $P_2O_5$.

|  |  |  |  |  |  |  |
|---|---|---|---|---|---|---|
| Strain Pt. (° C.) | 572 | 546.8 | 577 | 560.9948 | 559 | 572 |
| Anneal Pt. (° C.) | 626 | 597.4 | 631 | 613.35 | 608 | 625 |
| Soft Pt. (° C.) | 889 | 854.5 | 913 | 872.8 | 846 | 893 |
| CTE ($10^{7\circ}$ C.$^{-1}$) | 79.4 |  | 78.1 | 89 | 94.4 | 79.6 |
| Density (g/cm$^3$) | 2.391 | 2.384 | 2.371 | 2.4 | 2.42 | 2.389 |
| E Mod (Mpsi) | 9.579 |  | 9.264 | 9.56 | 9.458 | 9.645 |
| G Mod (Mpsi) | 3.955 |  | 3.791 | 3.891 | 3.836 | 3.938 |
| ν (Poisson's ratio) | 0.211 |  | 0.222 | 0.228 | 0.233 | 0.225 |
| Indentation Threshold (kgf) | 37.5 | 32 | 37.5 | 42.5 | 42.5 | 40 |
| CS (MPa)$^1$ | 769.54 |  | 801.86 |  | 861.80 | 830.03 |
| CS (MPa)$^1$ (SOC corrected) | 733.99 | 748.04 | 730.95 | 838.22 |  | 799.49 |
| DOL (μm)$^1$ | 53.95 | 53.90 | 53.75 | 53.58 | 53.55 | 53.55 |
| CS (MPa)$^2$ | 905.70 |  | 918.13 |  | 1080.27 | 939.81 |
| CS (MPa)$^2$ (SOC corrected) | 863.86 | 851.32 | 836.94 | 967.98 |  | 905.22 |
| DOL (μm)$^2$ | 40.24 | 43.64 | 43.41 | 42.77 | 42.36 | 40.85 |

| Glass (mol %) | 103 | 104 | 105 | 106 | 107 | 108 |
|---|---|---|---|---|---|---|
| SiO$_2$ | 65.01 | 64.02 | 64.37 | 64.27 | 65.59 | 65.08 |
| Al$_2$O$_3$ | 14.23 | 13.70 | 13.96 | 13.94 | 13.90 | 13.22 |
| B$_2$O$_3$ | 5.75 | 6.96 | 7.02 | 7.04 | 5.12 | 6.31 |
| Na$_2$O | 14.75 | 14.63 | 13.97 | 13.12 | 15.15 | 13.19 |
| K$_2$O | 0.08 | 0.50 | 0.01 | 0.52 | 0.11 | 0.51 |
| MgO | 0.04 | 0.02 | 0.01 | 0.01 | 0.01 | 1.50 |
| CaO | 0.03 | 0.06 | 0.06 | 0.06 | 0.03 | 0.08 |
| ZnO |  |  | 0.48 | 0.92 |  |  |
| P$_2$O$_5$ |  |  |  |  |  |  |
| SnO$_2$ | 0.10 | 0.10 | 0.10 | 0.10 | 0.07 | 0.10 |
| [Na$_2$O] + [K$_2$O] − [Al$_2$O$_3$] | 0.60 | 1.43 | 0.02 | −0.30 | 1.36 | 0.48 |
| [B$_2$O$_3$] − ([Na$_2$O] + [K$_2$O] − [Al$_2$O$_3$]) | 5.15 | 5.53 | 7.00 | 7.34 | 3.76 | 5.83 |
| Strain Pt. (° C.) | 566.5828 | 543.7 | 571 | 569 | 571 | 550 |
| Anneal Pt. (° C.) | 620.1886 | 591.9 | 627 | 624 | 621 | 603 |
| Soft Pt. (° C.) |  |  | 895 | 907 | 859 |  |
| CTE ($10^{7\circ}$ C.$^{-1}$) |  |  | 76 | 75.3 | 82.3 | 77 |
| Density (g/cm$^3$) |  | 2.389 | 2.381 | 2.39 | 2.403 | 2.39 |
| E Mod (Mpsi) |  |  | 9.322 | 9.46 | 9.868 | 9.746 |
| G Mod (Mpsi) |  |  | 3.814 | 3.849 | 4.074 | 3.99 |
| ν (Poisson's ratio) |  |  | 0.222 | 0.229 | 0.211 | 0.221 |
| Indentation Threshold (kgf) | 37.5 (Ann) | 22.5 | 27.5 | 32.5 | 17.5 | 37.5 |
| CS (MPa)$^1$ | 816.21 |  | 809.37 | 783.77 | 755.16 | 751.10 |
| CS (MPa)$^1$ (SOC corrected) | 780.61 | 706.79 | 752.35 | 725.48 | 737.30 |  |
| DOL (μm)$^1$ | 53.47 | 53.29 | 53.26 | 53.12 | 53.06 | 53.00 |
| CS (MPa)$^2$ | 930.06 |  | 943.17 |  | 950.90 |  |
| CS (MPa)$^2$ (SOC corrected) | 889.50 | 827.26 | 876.73 |  | 928.42 |  |
| DOL (μm)$^2$ | 42.92 | 41.77 | 39.99 |  | 41.16 |  |

| Glass (mol %) | 109 | 110 | 111 | 112 | 113 | 114 |
|---|---|---|---|---|---|---|
| SiO$_2$ | 64.48 | 63.80 | 63.21 | 64.47 | 66.65 | 62.81 |
| Al$_2$O$_3$ | 13.96 | 13.95 | 13.99 | 14.01 | 13.03 | 14.61 |
| B$_2$O$_3$ | 6.04 | 6.58 | 8.14 | 7.01 | 5.69 | 6.94 |
| Na$_2$O | 13.21 | 14.97 | 13.96 | 13.78 | 12.32 | 14.95 |
| K$_2$O | 0.10 | 0.50 | 0.50 | 0.00 | 1.01 | 0.51 |
| MgO | 2.10 | 0.02 | 0.02 | 0.53 | 1.06 | 0.02 |
| CaO | 0.03 | 0.06 | 0.06 | 0.07 | 0.13 | 0.06 |
| ZnO | 0.00 |  |  |  |  |  |
| P$_2$O$_5$ |  |  |  |  |  |  |
| SnO$_2$ | 0.07 | 0.10 | 0.10 | 0.10 | 0.10 | 0.09 |
| [Na$_2$O] + [K$_2$O] − [Al$_2$O$_3$] | −0.64 | 1.52 | 0.47 | −0.22 | 0.30 | 0.85 |
| [B$_2$O$_3$] − ([Na$_2$O] + [K$_2$O] − [Al$_2$O$_3$]) | 6.69 | 5.06 | 7.67 | 7.24 | 5.39 | 6.08 |
| Strain Pt. (° C.) | 583 | 546 | 556 | 574 | 559.3 | 548.2 |
| Anneal Pt. (° C.) | 637 | 594 | 608 | 630 | 614.1 | 598.5 |
| Soft Pt. (° C.) | 899 |  | 856 | 906 | 899.7 |  |
| CTE ($10^{7\circ}$ C.$^{-1}$) | 74.7 |  | 80.6 | 75.7 | 75.8 |  |
| Density (g/cm$^3$) | 2.387 |  | 2.375 | 2.372 | 2.375 |  |
| E Mod (Mpsi) | 9.746 |  | 9.276 | 9.305 |  |  |
| G Mod (Mpsi) | 3.957 |  | 3.807 | 3.825 |  |  |
| ν (Poisson's ratio) | 0.232 |  | 0.218 | 0.216 |  |  |
| Indentation Threshold (kgf) | 42.5 | 22.5 | 37.5 | 42.5 | 37.5 | 35 |
| CS (MPa)$^1$ | 811.03 |  | 748.11 | 812.57 |  |  |
| CS (MPa)$^1$ (SOC corrected) |  | 710.94 | 685.39 | 757.32 | 741.11 | 752.91 |
| DOL (μm)$^1$ | 52.89 | 52.79 | 52.77 | 52.74 | 52.73 | 52.66 |
| CS (MPa)$^2$ | 953.71 |  | 876.23 | 926.46 |  |  |
| CS (MPa)$^2$ (SOC corrected) |  | 833.02 | 802.77 | 863.47 | 804.99 | 856.01 |
| DOL (μm)$^2$ | 37.37 | 45.00 | 41.62 | 41.21 | 43.35 | 44.04 |

TABLE 2-continued

Compositions and selected physical properties of the glasses described herein that do not contain $P_2O_5$.

| Glass (mol %) | 115 | 116 | 117 | 118 | 119 | 120 |
|---|---|---|---|---|---|---|
| $SiO_2$ | 53.46 | 64.53 | 64.76 | 64.21 | 65.13 | 66.06 |
| $Al_2O_3$ | 18.42 | 13.91 | 13.97 | 14.68 | 13.10 | 13.66 |
| $B_2O_3$ | 9.13 | 6.61 | 5.57 | 5.73 | 6.07 | 5.74 |
| $Na_2O$ | 18.56 | 13.72 | 13.56 | 13.51 | 12.97 | 14.29 |
| $K_2O$ | 0.26 | 0.10 | 0.50 | 0.20 | 0.51 | 0.07 |
| MgO | 0.01 | 1.02 | 1.45 | 1.54 | 2.03 | 0.04 |
| CaO | 0.05 | 0.02 | 0.06 | 0.03 | 0.08 | 0.03 |
| ZnO | 0.00 | 0.00 | 0.00 | 0.00 | | |
| $P_2O_5$ | | | | | | |
| $SnO_2$ | 0.10 | 0.07 | 0.10 | 0.07 | 0.10 | 0.10 |
| $[Na_2O] + [K_2O] - [Al_2O_3]$ | 0.39 | −0.09 | 0.09 | −0.97 | 0.38 | 0.70 |
| $[B_2O_3] - ([Na_2O] + [K_2O] - [Al_2O_3])$ | 8.74 | 6.70 | 5.48 | 6.71 | 5.70 | 5.04 |
| Strain Pt. (° C.) | 556 | 578 | 577 | 598 | 553 | 563.1957 |
| Anneal Pt. (° C.) | 606 | 632 | 632 | 654 | 606 | 616.3392 |
| Soft Pt. (° C.) | 828 | 906 | 895 | 926 | | |
| CTE ($10^{7°}$ $C.^{-1}$) | 93.1 | 76.6 | 79 | 76.8 | 76.7 | |
| Density (g/cm$^3$) | 2.414 | 2.38 | 2.395 | 2.388 | 2.391 | |
| E Mod (Mpsi) | 9.292 | 9.544 | 9.605 | 9.664 | 9.822 | |
| G Mod (Mpsi) | 3.767 | 3.902 | 4.006 | 3.975 | 4.02 | |
| ν (Poisson's ratio) | 0.233 | 0.223 | 0.199 | 0.215 | 0.222 | |
| Indentation Threshold (kgf) | 42.5 | 47.5 | 42.5 | 37.5 | 37.5 | 37.5 (Ann) |
| CS (MPa)$^1$ | 824.51 | 820.08 | 791.46 | 840.55 | 740.40 | 789.01 |
| CS (MPa)$^1$ (SOC corrected) | | | 762.22 | 795.76 | | 753.01 |
| DOL (μm)$^1$ | 52.65 | 52.62 | 52.57 | 52.47 | 52.47 | 51.98 |
| CS (MPa)$^2$ | 1001.44 | 966.08 | 900.76 | 974.09 | | 905.41 |
| CS (MPa)$^2$ (SOC corrected) | | | 867.48 | 922.18 | | 864.11 |
| DOL (μm)$^2$ | 41.74 | 40.47 | 41.52 | 40.15 | | 41.55 |

| Glass (mol %) | 121 | 122 | 123 | 124 | 125 | 126 |
|---|---|---|---|---|---|---|
| $SiO_2$ | 67.63 | 62.14 | 64.53 | 66.44 | 66.45 | 66.42 |
| $Al_2O_3$ | 12.84 | 15.58 | 13.98 | 13.46 | 13.10 | 13.04 |
| $B_2O_3$ | 6.03 | 5.50 | 5.06 | 5.15 | 5.11 | 5.11 |
| $Na_2O$ | 12.81 | 15.76 | 13.74 | 12.63 | 13.00 | 13.10 |
| $K_2O$ | 0.51 | 0.06 | 0.51 | 0.20 | 0.20 | 0.20 |
| MgO | 0.01 | 0.92 | 2.00 | 2.01 | 2.01 | 2.01 |
| CaO | 0.07 | 0.04 | 0.06 | 0.03 | 0.03 | 0.03 |
| ZnO | | | 0.00 | 0.00 | 0.00 | 0.00 |
| $P_2O_5$ | | | | | | |
| $SnO_2$ | 0.10 | 0.08 | 0.10 | 0.07 | 0.07 | 0.07 |
| $[Na_2O] + [K_2O] - [Al_2O_3]$ | 0.48 | 0.24 | 0.28 | −0.63 | 0.10 | 0.26 |
| $[B_2O_3] - ([Na_2O] + [K_2O] - [Al_2O_3])$ | 5.54 | 5.25 | 4.78 | 5.78 | 5.01 | 4.85 |
| Strain Pt. (° C.) | 558 | 567.7924 | 581 | 597 | 587 | 585 |
| Anneal Pt. (° C.) | 612 | 620.85 | 634 | 654 | 642 | 639 |
| Soft Pt. (° C.) | 888 | 885 | 902 | 927 | 911 | 909 |
| CTE ($10^{7°}$ $C.^{-1}$) | 76.7 | 84.8 | 79.7 | 73.2 | 75 | 75.9 |
| Density (g/cm$^3$) | 2.374 | | 2.401 | 2.383 | 2.386 | 2.387 |
| E Mod (Mpsi) | 9.544 | 9.703 | 9.776 | 9.698 | 9.764 | 9.799 |
| G Mod (Mpsi) | 3.942 | 3.967 | 4.042 | 4.038 | 4.013 | 4.029 |
| ν (Poisson's ratio) | 0.211 | 0.223 | 0.209 | 0.201 | 0.216 | 0.216 |
| Indentation Threshold (kgf) | 17.5 | 37.5 | 35 | 35 | 40 | 40 |
| CS (MPa)$^1$ | 804.54 | | 796.84 | 807.95 | 802.46 | 799.16 |
| CS (MPa)$^1$ (SOC corrected) | | 869.82 | 776.81 | 772.02 | 766.77 | 764.54 |
| DOL (μm)$^1$ | 51.82 | 51.71 | 51.63 | 51.59 | 51.59 | 51.32 |
| CS (MPa)$^2$ | 873.09 | | 914.88 | 926.42 | 935.89 | 936.31 |
| CS (MPa)$^2$ (SOC corrected) | | 978.41 | 891.88 | 885.22 | 894.27 | 895.75 |
| DOL (μm)$^2$ | 42.02 | 40.62 | 40.07 | 39.96 | 39.90 | 40.19 |

| Glass (mol %) | 127 | 128 | 129 | 130 | 131 | 132 |
|---|---|---|---|---|---|---|
| $SiO_2$ | 65.17 | 64.57 | 65.24 | 66.44 | 64.33 | 67.77 |
| $Al_2O_3$ | 13.40 | 14.03 | 12.91 | 13.69 | 14.01 | 13.01 |
| $B_2O_3$ | 6.56 | 7.00 | 5.47 | 5.15 | 4.58 | 3.49 |
| $Na_2O$ | 12.77 | 12.71 | 12.67 | 12.37 | 13.82 | 12.74 |
| $K_2O$ | 1.01 | 0.49 | 0.51 | 0.20 | 0.51 | 0.10 |
| MgO | 0.87 | 1.01 | 3.01 | 2.03 | 2.57 | 2.76 |
| CaO | 0.12 | 0.07 | 0.09 | 0.02 | 0.06 | 0.04 |
| ZnO | | | | 0.00 | 0.00 | |
| $P_2O_5$ | | | | | | |
| $SnO_2$ | 0.10 | 0.10 | 0.10 | 0.07 | 0.10 | 0.07 |
| $[Na_2O] + [K_2O] - [Al_2O_3]$ | 0.38 | −0.83 | 0.27 | −1.12 | 0.33 | −0.17 |
| $[B_2O_3] - ([Na_2O] + [K_2O] - [Al_2O_3])$ | 6.17 | 7.83 | 5.20 | 6.28 | 4.24 | 3.66 |

TABLE 2-continued

Compositions and selected physical properties of the glasses described herein that do not contain $P_2O_5$.

| | | | | | | |
|---|---|---|---|---|---|---|
| Strain Pt. (° C.) | 549.7 | 576 | 561 | 604 | 588 | 604 |
| Anneal Pt. (° C.) | 603.3 | 631 | 613 | 661 | 640 | 660 |
| Soft Pt. (° C.) | 878.4 | 913 | | 939 | 899 | 942 |
| CTE ($10^{7°}$ C.$^{-1}$) | | 74.9 | 74.7 | 71.2 | 78.2 | 73.9 |
| Density (g/cm³) | 2.375 | 2.372 | 2.397 | 2.382 | 2.407 | 2.393 |
| E Mod (Mpsi) | | 9.425 | 9.964 | 9.803 | 9.885 | 9.945 |
| G Mod (Mpsi) | | 3.851 | 4.077 | 4.038 | 4.089 | 4.118 |
| ν (Poisson's ratio) | | 0.224 | 0.222 | 0.214 | 0.209 | 0.208 |
| Indentation Threshold (kgf) | 37.5 | 35 | 37.5 | 42.5 | 35 | 22.5 |
| CS (MPa)¹ | | 792.11 | 732.63 | 801.36 | 806.89 | 825.18 |
| CS (MPa)¹ (SOC corrected) | 712.77 | 728.85 | 710.62 | 762.74 | 794.90 | 811.15 |
| DOL (μm)¹ | 51.27 | 51.08 | 51.03 | 50.74 | 50.41 | 50.38 |
| CS (MPa)² | | 899.49 | | 920.82 | 928.73 | 940.49 |
| CS (MPa)² (SOC corrected) | 789.12 | 827.65 | | 876.44 | 914.92 | 924.50 |
| DOL (μm)² | 39.35 | 40.29 | | 38.95 | 39.34 | 38.92 |

| Glass (mol %) | 133 | 134 | 135 | 136 | 137 | 138 |
|---|---|---|---|---|---|---|
| $SiO_2$ | 64.46 | 56.17 | 63.39 | 65.74 | 63.39 | 65.08 |
| $Al_2O_3$ | 13.96 | 16.64 | 14.00 | 13.87 | 14.04 | 12.96 |
| $B_2O_3$ | 6.01 | 10.14 | 6.91 | 5.08 | 7.02 | 5.78 |
| $Na_2O$ | 14.86 | 15.77 | 14.08 | 12.94 | 13.84 | 13.00 |
| $K_2O$ | 0.51 | 0.98 | 0.51 | 0.11 | 0.50 | 0.51 |
| MgO | 0.01 | 0.05 | 0.01 | 2.13 | 1.03 | 2.49 |
| CaO | 0.06 | 0.13 | 0.06 | 0.04 | 0.07 | 0.09 |
| ZnO | | | 0.92 | | | |
| $P_2O_5$ | | | | | | |
| $SnO_2$ | 0.10 | 0.10 | 0.10 | 0.07 | 0.10 | 0.10 |
| [$Na_2O$] + [$K_2O$] − [$Al_2O_3$] | 1.42 | 0.12 | 0.60 | −0.82 | 0.29 | 0.55 |
| [$B_2O_3$] − ([$Na_2O$] + [$K_2O$] − [$Al_2O_3$]) | 4.59 | 10.02 | 6.31 | 5.90 | 6.73 | 5.23 |
| Strain Pt. (° C.) | 562 | 535 | 555 | 597 | 562 | 554 |
| Anneal Pt. (° C.) | 611 | 584 | 606 | 653 | 614 | 607 |
| Soft Pt. (° C.) | 852 | 821 | 861 | 928 | 875 | |
| CTE ($10^{7°}$ C.$^{-1}$) | 82.4 | 89.1 | 79.5 | 72.3 | 80.8 | 76.8 |
| Density (g/cm³) | 2.404 | 2.392 | 2.401 | 2.388 | 2.384 | 2.396 |
| E Mod (Mpsi) | 9.812 | 9.233 | 9.497 | 9.835 | 9.546 | 9.897 |
| G Mod (Mpsi) | 4.033 | 3.72 | 3.903 | 4.033 | 3.897 | 4.051 |
| ν (Poisson's ratio) | 0.216 | 0.241 | 0.217 | 0.219 | 0.225 | 0.222 |
| Indentation Threshold (kgf) | 17.5 | 27.5 | 32.5 | 32.5 | 42.5 | 37.5 |
| CS (MPa)¹ | 769.17 | 753.37 | 789.68 | 815.47 | 801.66 | 752.16 |
| CS (MPa)¹ (SOC corrected) | 750.06 | 697.75 | 758.32 | 779.91 | 773.92 | 730.45 |
| DOL¹ (μm) | 50.34 | 50.19 | 50.06 | 49.91 | 49.66 | 49.62 |
| CS (MPa)² | 905.17 | 926.36 | 930.69 | 931.65 | 927.02 | |
| CS (MPa)² (SOC corrected) | 882.69 | 857.96 | 893.73 | 891.02 | 894.94 | |
| DOL (μm)² | 39.37 | 39.87 | 38.28 | 38.80 | 38.61 | |

| Glass (mol %) | 139 | 140 | 141 | 142 | 143 | 144 |
|---|---|---|---|---|---|---|
| $SiO_2$ | 64.85 | 61.79 | 64.05 | 62.84 | 62.54 | 65.69 |
| $Al_2O_3$ | 13.01 | 16.47 | 14.24 | 13.97 | 13.89 | 13.68 |
| $B_2O_3$ | 6.81 | 5.04 | 5.91 | 8.37 | 8.83 | 6.28 |
| $Na_2O$ | 13.09 | 16.00 | 12.00 | 11.12 | 11.06 | 13.90 |
| $K_2O$ | 0.51 | 0.51 | 3.32 | 3.23 | 3.22 | 0.25 |
| MgO | 1.53 | 0.02 | 0.02 | 0.02 | 0.02 | 0.02 |
| CaO | 0.08 | 0.07 | 0.36 | 0.35 | 0.35 | 0.05 |
| ZnO | | | | | | |
| $P_2O_5$ | | | | | | |
| $SnO_2$ | 0.10 | 0.10 | 0.10 | 0.10 | 0.10 | 0.10 |
| [$Na_2O$] + [$K_2O$] − [$Al_2O_3$] | 0.59 | 0.04 | 1.08 | 0.39 | 0.38 | 0.47 |
| [$B_2O_3$] − ([$Na_2O$] + [$K_2O$] − [$Al_2O_3$]) | 6.22 | 4.99 | 4.83 | 7.99 | 8.44 | 5.81 |
| Strain Pt. (° C.) | 547 | 586.1 | 542 | 525 | 521 | 585 |
| Anneal Pt. (° C.) | 599 | 643.6 | 593 | 578 | 573 | 641 |
| Soft Pt. (° C.) | 857 | 926.5 | 841 | 834 | 826 | 925 |
| CTE ($10^{7°}$ C.$^{-1}$) | 76.4 | | 88 | 85.2 | 83.6 | 78.4 |
| Density (g/cm³) | 2.388 | 2.401 | 2.408 | 2.38 | 2.377 | 2.372 |
| E Mod (Mpsi) | 9.712 | | 9.876 | 9.389 | 9.349 | 9.369 |
| G Mod (Mpsi) | 3.981 | | 4.074 | 3.848 | 3.768 | 3.854 |
| ν (Poisson's ratio) | 0.22 | | 0.212 | 0.22 | 0.241 | 0.216 |
| Indentation Threshold (kgf) | 37.5 | 22.5 | 22.5 (Ann) | 22.5 (Ann) | 27.5 (Ann) | 37.5 |
| CS (MPa)¹ | 722.07 | | | | | |
| CS (MPa)¹ (SOC corrected) | | | | | | |
| DOL (μm)¹ | 49.44 | | | | | |
| CS (MPa)² | 849.69 | | 801.14 | 703.76 | 693.72 | 930.58 |
| CS (MPa)² (SOC corrected) | | 981.12 | | | | 859.49 |
| DOL (μm)² | 36.69 | 62.27 | 54.02 | 53.07 | 50.85 | 49.26 |

TABLE 2-continued

Compositions and selected physical properties of the glasses described herein that do not contain $P_2O_5$.

| Glass (mol %) | 145 | 146 | 147 | 148 | 149 | 150 |
|---|---|---|---|---|---|---|
| $SiO_2$ | 62.21 | 63.18 | 61.99 | 62.37 | 63.24 | 62.10 |
| $Al_2O_3$ | 13.82 | 13.45 | 13.78 | 13.86 | 13.45 | 13.48 |
| $B_2O_3$ | 9.32 | 9.03 | 8.87 | 8.33 | 8.93 | 9.99 |
| $Na_2O$ | 11.00 | 13.23 | 11.71 | 11.75 | 13.26 | 13.31 |
| $K_2O$ | 3.20 | 0.94 | 3.19 | 3.21 | 0.94 | 0.95 |
| MgO | 0.01 | 0.01 | 0.02 | 0.02 | 0.01 | 0.01 |
| CaO | 0.34 | 0.02 | 0.34 | 0.34 | 0.02 | 0.02 |
| ZnO | | | | | | |
| $P_2O_5$ | | | | | | |
| $SnO_2$ | 0.10 | 0.11 | 0.10 | 0.10 | 0.12 | 0.12 |
| $[Na_2O] + [K_2O] - [Al_2O_3]$ | 0.38 | 0.71 | 1.13 | 1.11 | 0.76 | 0.78 |
| $[B_2O_3] - ([Na_2O] + [K_2O] - [Al_2O_3])$ | 8.95 | 8.32 | 7.74 | 7.23 | 8.17 | 9.21 |
| Strain Pt. (° C.) | 518 | 548 | 518 | 523 | 550 | |
| Anneal Pt. (° C.) | 570 | 601 | 566 | 571 | 602 | |
| Soft Pt. (° C.) | 824 | 850 | 797 | 808 | 841 | |
| CTE ($10^{7°}$ $C.^{-1}$) | 84 | 79.7 | 85.6 | 85.2 | 79.6 | |
| Density (g/cm$^3$) | 2.374 | 2.359 | 2.389 | 2.393 | 2.363 | |
| E Mod (Mpsi) | 9.245 | 9.14 | 9.524 | 9.596 | | |
| G Mod (Mpsi) | 3.799 | 3.736 | 3.902 | 3.935 | | |
| ν (Poisson's ratio) | 0.217 | 0.223 | 0.221 | 0.219 | | |
| Indentation Threshold (kgf) | 32.5 (Ann) | 32 (Ann) | 22.5 (Ann) | 17.5 (Ann) | 35 (Ann) | 32.5 (Ann) |
| CS (MPa)$^1$ | | | | | | |
| CS (MPa)$^1$ (SOC corrected) | | | | | | |
| DOL (μm)$^1$ | | | | | | |
| CS (MPa)$^2$ | 688.61 | 861.02 | 719.85 | 726.49 | 865.32 | 820.65 |
| CS (MPa)$^2$ (SOC corrected) | | 784.54 | | | 788.46 | |
| DOL (μm)$^2$ | 48.85 | 48.13 | 47.96 | 47.80 | 47.30 | 47.09 |

| Glass (mol %) | 151 | 152 | 153 | 154 | 155 | 156 |
|---|---|---|---|---|---|---|
| $SiO_2$ | 62.70 | 64.44 | 68.60 | 64.26 | 64.88 | 64.24 |
| $Al_2O_3$ | 13.94 | 12.27 | 12.86 | 12.73 | 13.71 | 12.45 |
| $B_2O_3$ | 7.89 | 10.01 | 5.08 | 8.97 | 7.98 | 9.47 |
| $Na_2O$ | 11.79 | 12.16 | 12.75 | 12.93 | 12.27 | 12.73 |
| $K_2O$ | 3.21 | 0.95 | 0.52 | 0.94 | 1.02 | 0.94 |
| MgO | 0.02 | 0.01 | 0.01 | 0.01 | 0.01 | 0.01 |
| CaO | 0.35 | 0.02 | 0.07 | 0.02 | 0.01 | 0.02 |
| ZnO | | | | | | |
| $P_2O_5$ | | | | | | |
| $SnO_2$ | 0.10 | 0.12 | 0.10 | 0.12 | 0.12 | 0.12 |
| $[Na_2O] + [K_2O] - [Al_2O_3]$ | 1.05 | 0.84 | 0.41 | 1.14 | -0.43 | 1.22 |
| $[B_2O_3] - ([Na_2O] + [K_2O] - [Al_2O_3])$ | 6.84 | 9.17 | 4.67 | 7.84 | 8.40 | 8.25 |
| Strain Pt. (° C.) | 531 | 536 | 571 | 543 | 550 | 540 |
| Anneal Pt. (° C.) | 579 | 588 | 628 | 594 | 609 | 589 |
| Soft Pt. (° C.) | 808 | 835 | 917 | 833 | 897 | 828 |
| CTE ($10^{7°}$ $C.^{-1}$) | 86.9 | 78 | 75.7 | 76.1 | 77.6 | |
| Density (g/cm$^3$) | 2.396 | 2.346 | 2.377 | 2.363 | 2.361 | 2.358 |
| E Mod (Mpsi) | 9.678 | 8.982 | 9.654 | | 9.22 | 9.14 |
| G Mod (Mpsi) | 3.971 | 3.69 | 3.987 | | 3.781 | 3.767 |
| ν (Poisson's ratio) | 0.219 | 0.217 | 0.211 | | 0.219 | 0.213 |
| Indentation Threshold (kgf) | 22.5 | 32.5 | 32.5 | 32.5 | 32.5 | 32.5 |
| CS (MPa)$^1$ | | | 762.53 | | | |
| CS (MPa)$^1$ (SOC corrected) | | | | | | |
| DOL (μm)$^1$ | | | 48.26 | | | |
| CS (MPa)$^2$ | 760.22 | 715.21 | 880.90 | 820.69 | 774.93 | 789.60 |
| CS (MPa)$^2$ (SOC corrected) | | | | | | |
| DOL (μm)$^2$ | 47.06 | 46.76 | 46.44 | 46.23 | 46.10 | 45.68 |

| Glass (mol %) | 157 | 158 | 159 | 160 | 161 | 162 |
|---|---|---|---|---|---|---|
| $SiO_2$ | 51.33 | 62.37 | 62.08 | 55.91 | 64.96 | 62.21 |
| $Al_2O_3$ | 20.21 | 13.46 | 14.39 | 18.37 | 14.21 | 14.18 |
| $B_2O_3$ | 7.03 | 9.78 | 9.02 | 6.62 | 6.97 | 8.97 |
| $Na_2O$ | 19.17 | 13.26 | 13.37 | 18.66 | 12.72 | 13.51 |
| $K_2O$ | 0.97 | 0.95 | 1.02 | 0.26 | 0.98 | 1.01 |
| MgO | 1.03 | 0.01 | 0.00 | 0.02 | 0.01 | 0.01 |
| CaO | 0.13 | 0.02 | 0.02 | 0.05 | 0.01 | 0.02 |
| ZnO | | | | 0.00 | | |
| $P_2O_5$ | | | | | | |
| $SnO_2$ | 0.10 | 0.12 | 0.10 | 0.10 | 0.12 | 0.10 |
| $[Na_2O] + [K_2O] - [Al_2O_3]$ | -0.07 | 0.74 | 0.00 | 0.55 | -0.50 | 0.33 |
| $[B_2O_3] - ([Na_2O] + [K_2O] - [Al_2O_3])$ | 7.10 | 9.04 | 9.02 | 6.07 | 7.47 | 8.64 |

TABLE 2-continued

Compositions and selected physical properties of the glasses described herein that do not contain $P_2O_5$.

| | | | | | | |
|---|---|---|---|---|---|---|
| Strain Pt. (° C.) | 564 | 540 | 538 | 575 | 567 | 532 |
| Anneal Pt. (° C.) | 615 | 593 | 593 | 626 | 627 | 584 |
| Soft Pt. (° C.) | 851 | 840 | 868 | 866 | 921 | 841 |
| CTE ($10^{7\circ}$ C.$^{-1}$) | 97.2 | 80.6 | 81.2 | 91.5 | 77.6 | 82.2 |
| Density (g/cm$^3$) | 2.443 | 2.359 | 2.367 | 2.427 | 2.371 | 2.365 |
| E Mod (Mpsi) | 9.786 | | 9.116 | 9.557 | 9.354 | 9.282 |
| G Mod (Mpsi) | 3.945 | | 3.727 | 3.903 | 3.854 | 3.761 |
| ν (Poisson's ratio) | 0.24 | | 0.223 | 0.224 | 0.214 | 0.234 |
| Indentation Threshold (kgf) | 12.5 | 32.5 | 32.5 | 32.5 | 32.5 | 32.5 |
| CS (MPa)$^1$ | 1020.56 | | | | | |
| CS (MPa)$^1$ (SOC corrected) | 977.84 | | | | | |
| DOL (μm)$^1$ | 49.18 | | | | | |
| CS (MPa)$^2$ | 1083.22 | 834.56 | 809.46 | 1069.90 | 934.83 | 792.98 |
| CS (MPa)$^2$ (SOC corrected) | 1037.89 | | | | | |
| DOL (μm)$^2$ | 45.55 | 45.52 | 45.37 | 45.24 | 45.19 | 44.83 |

| Glass (mol %) | 163 | 164 | 165 | 166 | 167 | 168 |
|---|---|---|---|---|---|---|
| SiO$_2$ | 61.74 | 65.30 | 62.13 | 64.46 | 65.29 | 62.12 |
| Al$_2$O$_3$ | 13.71 | 13.87 | 14.33 | 13.94 | 13.96 | 13.92 |
| B$_2$O$_3$ | 9.29 | 6.25 | 8.13 | 6.97 | 6.25 | 9.02 |
| Na$_2$O | 11.63 | 13.83 | 14.32 | 13.87 | 14.00 | 13.81 |
| K$_2$O | 3.17 | 0.50 | 0.98 | 0.51 | 0.24 | 1.00 |
| MgO | 0.02 | 0.01 | 0.01 | 0.01 | 0.01 | 0.01 |
| CaO | 0.34 | 0.07 | 0.02 | 0.06 | 0.06 | 0.02 |
| ZnO | | | | | | |
| P$_2$O$_5$ | | | | | | |
| SnO$_2$ | 0.10 | 0.12 | 0.10 | 0.12 | 0.12 | 0.10 |
| [Na$_2$O] + [K$_2$O] − [Al$_2$O$_3$] | 1.09 | 0.46 | 0.97 | 0.44 | 0.29 | 0.89 |
| [B$_2$O$_3$] − ([Na$_2$O] + [K$_2$O] − [Al$_2$O$_3$]) | 8.19 | 5.79 | 7.16 | 6.54 | 5.96 | 8.13 |
| Strain Pt. (° C.) | 514 | 574 | 536 | 566 | 579 | 530 |
| Anneal Pt. (° C.) | 563 | 628 | 585 | 620 | 635 | 581 |
| Soft Pt. (° C.) | 789 | 894 | 827 | 893 | 908 | 824 |
| CTE ($10^{7\circ}$ C.$^{-1}$) | 84.4 | 79.2 | 84.2 | 79.8 | 78.7 | 82.4 |
| Density (g/cm$^3$) | 2.386 | 2.384 | 2.39 | 2.379 | 2.381 | 2.377 |
| E Mod (Mpsi) | 9.486 | 9.556 | 9.495 | 9.454 | 9.463 | 9.381 |
| G Mod (Mpsi) | 3.881 | 3.906 | 3.902 | 3.843 | 3.873 | 3.81 |
| ν (Poisson's ratio) | 0.222 | 0.223 | 0.217 | 0.23 | 0.222 | 0.231 |
| Indentation Threshold (kgf) | 22.5 | 32.5 | 32.5 | 32.5 | 32.5 | 32.5 |
| CS (MPa)$^1$ | | | | | | |
| CS (MPa)$^1$ (SOC corrected) | | | | | | |
| DOL (μm)$^1$ | | | | | | |
| CS (MPa)$^2$ | 704.31 | 934.16 | 845.92 | 915.32 | 946.70 | 805.04 |
| CS (MPa)$^2$ (SOC corrected) | | 875.26 | | 859.38 | 875.65 | |
| DOL (μm)$^2$ | 44.05 | 43.95 | 43.71 | 43.15 | 42.95 | 42.68 |

| Glass (mol %) | 169 | 170 | 171 | 172 | 173 | 174 |
|---|---|---|---|---|---|---|
| SiO$_2$ | 62.09 | 64.23 | 65.29 | 62.19 | 62.83 | 64.24 |
| Al$_2$O$_3$ | 14.10 | 12.01 | 13.88 | 13.85 | 13.16 | 12.46 |
| B$_2$O$_3$ | 8.59 | 10.01 | 6.24 | 9.00 | 9.92 | 9.44 |
| Na$_2$O | 14.09 | 11.70 | 14.07 | 13.81 | 12.98 | 12.74 |
| K$_2$O | 1.01 | 1.91 | 0.26 | 1.02 | 0.99 | 0.94 |
| MgO | 0.01 | 0.00 | 0.01 | 0.01 | 0.00 | 0.01 |
| CaO | 0.02 | 0.02 | 0.06 | 0.02 | 0.02 | 0.02 |
| ZnO | | | | | | |
| P$_2$O$_5$ | | | | | | |
| SnO$_2$ | 0.10 | 0.12 | 0.12 | 0.10 | 0.10 | 0.12 |
| [Na$_2$O] + [K$_2$O] − [Al$_2$O$_3$] | 1.01 | 1.60 | 0.45 | 0.97 | 0.81 | 1.22 |
| [B$_2$O$_3$] − ([Na$_2$O] + [K$_2$O] − [Al$_2$O$_3$]) | 7.58 | 8.41 | 5.79 | 8.03 | 9.11 | 8.22 |
| Strain Pt. (° C.) | 529 | 514 | 576 | 526 | 520 | |
| Anneal Pt. (° C.) | 578 | 561 | 630 | 575 | 570 | |
| Soft Pt. (° C.) | 808 | 783 | 897 | 816 | 808 | |
| CTE ($10^{7\circ}$ C.$^{-1}$) | 83.4 | 77.5 | 79.5 | 83 | 79.2 | |
| Density (g/cm$^3$) | 2.387 | 2.367 | 2.383 | 2.379 | 2.363 | |
| E Mod (Mpsi) | 9.436 | 9.365 | 9.425 | 9.319 | 9.202 | |
| G Mod (Mpsi) | 3.884 | 3.833 | 3.931 | 3.838 | 3.742 | |
| ν (Poisson's ratio) | 0.215 | 0.222 | 0.199 | 0.214 | 0.23 | |
| Indentation Threshold (kgf) | 32.5 | 32.5 | 32.5 | 32.5 | 32.5 | 32.5 |
| CS (MPa)$^1$ | | | | | | |
| CS (MPa)$^1$ (SOC corrected) | | | | | | |
| DOL (μm)$^1$ | | | | | | |
| CS (MPa)$^2$ | 816.97 | 649.74 | 945.67 | 786.16 | 717.94 | 818.76 |
| CS (MPa)$^2$ (SOC corrected) | | | 883.18 | | | |
| DOL (μm)$^2$ | 42.18 | 42.17 | 41.94 | 41.82 | 41.74 | 41.73 |

TABLE 2-continued

Compositions and selected physical properties of the glasses described herein that do not contain $P_2O_5$.

| Glass (mol %) | 175 | 176 | 177 | 178 | 179 | 180 |
|---|---|---|---|---|---|---|
| $SiO_2$ | 64.38 | 63.93 | 65.07 | 66.09 | 64.40 | 64.14 |
| $Al_2O_3$ | 12.02 | 13.83 | 13.92 | 13.08 | 13.44 | 13.42 |
| $B_2O_3$ | 9.80 | 8.09 | 6.31 | 6.97 | 8.95 | 7.15 |
| $Na_2O$ | 12.69 | 13.44 | 14.45 | 13.17 | 12.13 | 14.11 |
| $K_2O$ | 0.93 | 0.51 | 0.01 | 0.51 | 0.96 | 1.04 |
| MgO | 0.01 | 0.02 | 0.01 | 0.01 | 0.00 | 0.00 |
| CaO | 0.02 | 0.07 | 0.06 | 0.07 | 0.01 | 0.02 |
| ZnO | | | | | | |
| $P_2O_5$ | | | | | | |
| $SnO_2$ | 0.12 | 0.10 | 0.12 | 0.10 | 0.10 | 0.12 |
| $[Na_2O] + [K_2O] - [Al_2O_3]$ | 1.60 | 0.12 | 0.54 | 0.61 | -0.35 | 1.74 |
| $[B_2O_3] - ([Na_2O] + [K_2O] - [Al_2O_3])$ | 8.21 | 7.97 | 5.78 | 6.37 | 9.30 | 5.41 |
| Strain Pt. (° C.) | 535 | 541 | 576 | 551 | 539 | 539 |
| Anneal Pt. (° C.) | 583 | 597 | 629 | 605 | 595 | 586 |
| Soft Pt. (° C.) | 807 | 881 | 894 | 879 | 878 | 810 |
| CTE ($10^{-7}$ ° $C.^{-1}$) | | 78.5 | 78.4 | 77.9 | 73.5 | 82.1 |
| Density (g/cm³) | 2.36 | 2.368 | 2.385 | 2.373 | 2.354 | 2.398 |
| E Mod (Mpsi) | 9.257 | 9.257 | 9.432 | 9.46 | 9.027 | 9.836 |
| G Mod (Mpsi) | 3.799 | 3.777 | 3.887 | 3.874 | 3.725 | 4.031 |
| ν (Poisson's ratio) | 0.219 | 0.225 | 0.213 | 0.221 | 0.212 | 0.22 |
| Indentation Threshold (kgf) | 32.5 (Ann) | >25 | 32.5 | 22.5 | 35 (Ann) | 17.5 (Ann) |
| CS (MPa)¹ | | | | | | |
| CS (MPa)¹ (SOC corrected) | | | | | | |
| DOL (μm)¹ | | | | | | |
| CS (MPa)² | 788.63 | 863.11 | 955.90 | 862.03 | 763.13 | 836.58 |
| CS (MPa)² (SOC corrected) | | | 888.56 | | | |
| DOL (μm)² | 41.43 | 41.31 | 41.12 | 41.12 | 40.69 | 40.65 |

| Glass (mol %) | 181 | 182 | 183 | 184 | 185 | 186 |
|---|---|---|---|---|---|---|
| $SiO_2$ | 62.13 | 61.38 | 64.41 | 64.67 | 60.98 | 65.38 |
| $Al_2O_3$ | 13.59 | 13.64 | 12.94 | 13.50 | 13.80 | 12.94 |
| $B_2O_3$ | 9.50 | 9.79 | 10.07 | 8.97 | 10.16 | 7.10 |
| $Na_2O$ | 13.64 | 11.58 | 11.38 | 12.73 | 13.92 | 13.88 |
| $K_2O$ | 1.01 | 3.15 | 1.04 | 0.02 | 1.01 | 0.51 |
| MgO | 0.00 | 0.02 | 0.01 | 0.01 | 0.01 | 0.01 |
| CaO | 0.02 | 0.34 | 0.03 | 0.01 | 0.02 | 0.06 |
| ZnO | | | | | | |
| $P_2O_5$ | | | | | | |
| $SnO_2$ | 0.10 | 0.10 | 0.12 | 0.08 | 0.10 | 0.10 |
| $[Na_2O] + [K_2O] - [Al_2O_3]$ | 1.06 | 1.09 | -0.52 | -0.75 | 1.13 | 1.44 |
| $[B_2O_3] - ([Na_2O] + [K_2O] - [Al_2O_3])$ | 8.44 | 8.70 | 10.59 | 9.72 | 9.04 | 5.66 |
| Strain Pt. (° C.) | 522 | 512 | 529 | 569 | 517 | 554 |
| Anneal Pt. (° C.) | 571 | 560 | 586 | 628 | 565 | 602 |
| Soft Pt. (° C.) | 799 | 792 | 876 | 909 | 786 | 836 |
| CTE ($10^{-7}$ ° $C.^{-1}$) | 81.8 | 85.3 | 73.9 | 69.8 | 83.9 | 79.3 |
| Density (g/cm³) | 2.375 | 2.384 | 2.343 | 2.345 | 2.375 | 2.388 |
| E Mod (Mpsi) | 9.319 | 9.472 | 8.962 | 9.01 | 9.32 | 9.677 |
| G Mod (Mpsi) | 3.819 | 3.859 | 3.658 | 3.697 | 3.804 | 3.981 |
| ν (Poisson's ratio) | 0.22 | 0.227 | 0.225 | 0.219 | 0.225 | 0.215 |
| Indentation Threshold (kgf) | 32.5 | 32.5 | 32.5 | 32.5 | 22.5 | 25 |
| CS (MPa)¹ | | | | | | 729.73 |
| CS (MPa)¹ (SOC corrected) | | | | | | 695.30 |
| DOL (μm)¹ | | | | | | 48.21 |
| CS (MPa)² | 742.96 | 716.14 | 684.53 | 808.33 | 757.92 | 857.10 |
| CS (MPa)² (SOC corrected) | | | | | | 816.65 |
| DOL (μm)² | 40.65 | 40.59 | 40.52 | 40.46 | 39.98 | 39.86 |

| Glass (mol %) | 187 | 188 | 189 | 190 | 191 | 192 |
|---|---|---|---|---|---|---|
| $SiO_2$ | 64.48 | 64.56 | 62.26 | 65.09 | 61.29 | 64.50 |
| $Al_2O_3$ | 12.48 | 13.14 | 13.68 | 13.81 | 13.54 | 13.00 |
| $B_2O_3$ | 10.05 | 9.02 | 8.99 | 6.24 | 10.24 | 7.98 |
| $Na_2O$ | 11.81 | 12.05 | 13.95 | 14.60 | 13.73 | 13.39 |
| $K_2O$ | 1.03 | 1.09 | 1.00 | 0.01 | 1.07 | 0.99 |
| MgO | 0.01 | 0.01 | 0.00 | 0.01 | 0.01 | 0.01 |
| CaO | 0.02 | 0.01 | 0.02 | 0.06 | 0.02 | 0.01 |
| ZnO | | | | | | |
| $P_2O_5$ | | | | | | |
| $SnO_2$ | 0.12 | 0.12 | 0.10 | 0.12 | 0.10 | 0.12 |
| $[Na_2O] + [K_2O] - [Al_2O_3]$ | 0.37 | 0.01 | 1.26 | 0.80 | 1.26 | 1.37 |
| $[B_2O_3] - ([Na_2O] + [K_2O] - [Al_2O_3])$ | 9.68 | 9.01 | 7.73 | 5.44 | 8.98 | 6.61 |

TABLE 2-continued

Compositions and selected physical properties of the glasses described herein that do not contain $P_2O_5$.

| | | | | | | |
|---|---|---|---|---|---|---|
| Strain Pt. (° C.) | 522 | 530 | 527 | 570 | 518 | 533 |
| Anneal Pt. (° C.) | 576 | 586 | 574 | 621 | 566 | 582 |
| Soft Pt. (° C.) | 835 | 867 | 803 | 879 | 780 | 819 |
| CTE ($10^{7°}$ C.$^{-1}$) | 75.5 | 76.6 | 82.2 | 78.8 | 82.1 | 79.7 |
| Density (g/cm$^3$) | 2.349 | 2.355 | 2.383 | 2.388 | 2.378 | 2.383 |
| E Mod (Mpsi) | 9.007 | 9.09 | 9.621 | 9.355 | 9.342 | 9.568 |
| G Mod (Mpsi) | 3.713 | 3.742 | 3.868 | 3.857 | 3.809 | 3.949 |
| ν (Poisson's ratio) | 0.213 | 0.215 | 0.244 | 0.213 | 0.226 | 0.211 |
| Indentation Threshold (kgf) | 32.5 | 32.5 | 17.5 | 32.5 | 32.5 | 17 |
| CS (MPa)$^1$ | | | | | | |
| CS (MPa)$^1$ (SOC corrected) | | | | | | |
| DOL (μm)$^1$ | | | | | | |
| CS (MPa)$^2$ | 683.02 | 755.13 | 799.44 | 946.67 | 746.92 | 792.49 |
| CS (MPa)$^2$ (SOC corrected) | | | | 872.33 | | |
| DOL (μm)$^2$ | 39.53 | 39.51 | 39.43 | 39.31 | 38.99 | 38.97 |

| Glass (mol %) | 193 | 194 | 195 | 196 | 197 | 198 |
|---|---|---|---|---|---|---|
| SiO$_2$ | 65.43 | 64.11 | 64.72 | 62.40 | 67.63 | 61.87 |
| Al$_2$O$_3$ | 13.23 | 14.71 | 13.33 | 13.17 | 13.22 | 13.30 |
| B$_2$O$_3$ | 5.91 | 5.22 | 8.00 | 10.40 | 3.45 | 10.22 |
| Na$_2$O | 12.33 | 13.55 | 13.26 | 12.90 | 12.61 | 13.46 |
| K$_2$O | 1.01 | 0.20 | 0.51 | 0.99 | 0.10 | 1.04 |
| MgO | 2.13 | 2.10 | 0.01 | 0.01 | 2.87 | 0.01 |
| CaO | 0.14 | 0.03 | 0.07 | 0.02 | 0.04 | 0.02 |
| ZnO | | 0.00 | | | | |
| P$_2$O$_5$ | | | | | | |
| SnO$_2$ | 0.10 | 0.07 | 0.10 | 0.10 | 0.07 | 0.10 |
| [Na$_2$O] + [K$_2$O] − [Al$_2$O$_3$] | 0.12 | −0.96 | 0.44 | 0.72 | −0.52 | 1.20 |
| [B$_2$O$_3$] − ([Na$_2$O] + [K$_2$O] − [Al$_2$O$_3$]) | 5.79 | 6.18 | 7.56 | 9.68 | 3.96 | 9.02 |
| Strain Pt. (° C.) | 557.1 | 598 | 539 | 518 | 610 | 517 |
| Anneal Pt. (° C.) | 610.8 | 652 | 590 | 568 | 665 | 566 |
| Soft Pt. (° C.) | | 922 | 861 | 798 | 935 | 787 |
| CTE ($10^{7°}$ C.$^{-1}$) | | 76.7 | 79.3 | 77.5 | 71.2 | 81.5 |
| Density (g/cm$^3$) | | 2.396 | 2.37 | 2.361 | 2.392 | 2.373 |
| E Mod (Mpsi) | | 9.861 | 9.329 | 9.119 | 9.969 | 9.34 |
| G Mod (Mpsi) | | 4.031 | 3.819 | 3.722 | 4.142 | 3.799 |
| ν (Poisson's ratio) | | 0.223 | 0.221 | 0.225 | 0.203 | 0.229 |
| Indentation Threshold (kgf) | 32.5 | 47.5 | 17.5 | 32.5 | 22.5 | 32.5 |
| CS (MPa)$^1$ | | 859.15 | | | 829.12 | |
| CS (MPa)$^1$ (SOC corrected) | 739.27 | 829.92 | | | 815.28 | |
| DOL (μm)$^1$ | 48.95 | 47.87 | | | 49.41 | |
| CS (MPa)$^2$ | | 985.85 | 862.47 | 722.43 | 937.28 | 753.27 |
| CS (MPa)$^2$ (SOC corrected) | 790.05 | 952.31 | | | 921.63 | |
| DOL (μm)$^2$ | 38.96 | 38.91 | 38.86 | 38.76 | 38.73 | 38.71 |

| Glass (mol %) | 199 | 200 | 201 | 202 | 203 | 204 |
|---|---|---|---|---|---|---|
| SiO$_2$ | 61.93 | 64.35 | 64.46 | 63.06 | 66.86 | 63.31 |
| Al$_2$O$_3$ | 13.32 | 13.43 | 12.99 | 12.87 | 13.54 | 14.01 |
| B$_2$O$_3$ | 10.21 | 8.44 | 7.12 | 10.01 | 3.41 | 7.11 |
| Na$_2$O | 13.39 | 13.63 | 13.76 | 12.91 | 13.47 | 14.87 |
| K$_2$O | 1.03 | 0.02 | 1.48 | 1.02 | 0.00 | 0.51 |
| MgO | 0.00 | 0.01 | 0.01 | 0.01 | 2.57 | 0.01 |
| CaO | 0.02 | 0.01 | 0.06 | 0.02 | 0.04 | 0.06 |
| ZnO | | | | | | |
| P$_2$O$_5$ | | | | | | |
| SnO$_2$ | 0.10 | 0.10 | 0.10 | 0.10 | 0.08 | 0.10 |
| [Na$_2$O] + [K$_2$O] − [Al$_2$O$_3$] | 1.10 | 0.21 | 2.25 | 1.07 | −0.07 | 1.37 |
| [B$_2$O$_3$] − ([Na$_2$O] + [K$_2$O] − [Al$_2$O$_3$]) | 9.12 | 8.23 | 4.87 | 8.94 | 3.47 | 5.74 |
| Strain Pt. (° C.) | 518 | 547 | 544 | 517 | 596.8418 | 557 |
| Anneal Pt. (° C.) | 566 | 600 | 590 | 567 | 651.925 | 604 |
| Soft Pt. (° C.) | 815 | 867 | 803 | 796 | 930 | 838 |
| CTE ($10^{7°}$ C.$^{-1}$) | 81.5 | 75.7 | 83.4 | 79.7 | 74.4 | 82.8 |
| Density (g/cm$^3$) | 2.372 | 2.362 | 2.405 | 2.364 | | 2.397 |
| E Mod (Mpsi) | 9.252 | 9.09 | 9.882 | 9.261 | 10.046 | 9.668 |
| G Mod (Mpsi) | 3.787 | 3.767 | 4.092 | 3.781 | 4.115 | 3.962 |
| ν (Poisson's ratio) | 0.222 | 0.207 | 0.208 | 0.225 | 0.221 | 0.22 |
| Indentation Threshold (kgf) | 32.5 | 33.5 | 22.5 | 32.5 | 17.5 | 17.5 |
| CS (MPa)$^1$ | | | 675.85 | | | 758.41 |
| CS (MPa)$^1$ (SOC corrected) | | | 663.13 | | 873.85 | 735.51 |
| DOL (μm)$^1$ | | | 47.67 | | 47.97 | 47.46 |
| CS (MPa)$^2$ | 735.23 | 850.10 | 812.89 | 739.90 | | 905.98 |
| CS (MPa)$^2$ (SOC corrected) | | | 797.59 | | 951.73 | 878.63 |
| DOL (μm)$^2$ | 38.58 | 38.51 | 38.48 | 38.47 | 38.37 | 38.19 |

TABLE 2-continued

Compositions and selected physical properties of the glasses described herein that do not contain $P_2O_5$.

| Glass (mol %) | 205 | 206 | 207 | 208 | 209 | 210 |
|---|---|---|---|---|---|---|
| $SiO_2$ | 64.19 | 63.98 | 68.73 | 67.78 | 67.53 | 57.08 |
| $Al_2O_3$ | 12.66 | 14.65 | 13.23 | 13.46 | 13.77 | 18.53 |
| $B_2O_3$ | 10.08 | 4.65 | 3.44 | 3.46 | 3.43 | 4.99 |
| $Na_2O$ | 11.86 | 13.71 | 12.01 | 12.28 | 12.68 | 18.69 |
| $K_2O$ | 1.05 | 0.21 | 0.00 | 0.10 | 0.00 | 0.49 |
| MgO | 0.01 | 2.68 | 2.46 | 2.79 | 2.47 | 0.01 |
| CaO | 0.02 | 0.03 | 0.04 | 0.04 | 0.04 | 0.07 |
| ZnO | | 0.00 | | | | |
| $P_2O_5$ | | | | | | |
| $SnO_2$ | 0.12 | 0.07 | 0.06 | 0.07 | 0.07 | 0.10 |
| $[Na_2O] + [K_2O] - [Al_2O_3]$ | 0.26 | -0.73 | -1.22 | -1.09 | -1.09 | 0.65 |
| $[B_2O_3] - ([Na_2O] + [K_2O] - [Al_2O_3])$ | 9.82 | 5.38 | 4.66 | 4.55 | 4.52 | 4.34 |
| Strain Pt. (° C.) | 522 | 602 | 611.8241 | 618 | 609.9735 | 599 |
| Anneal Pt. (° C.) | 576 | 656 | 669.7462 | 674 | 667.3236 | 654 |
| Soft Pt. (° C.) | 846 | 917 | 961 | 952 | 961.4 | 922 |
| CTE ($10^{7°}$ $C.^{-1}$) | 75.3 | 76.7 | 69.4 | 70.6 | 72 | 95.3 |
| Density (g/cm$^3$) | 2.346 | 2.403 | | 2.391 | 2.388 | 2.429 |
| E Mod (Mpsi) | 8.96 | 9.998 | 10.076 | 10.021 | 10.04 | 9.774 |
| G Mod (Mpsi) | 3.691 | 4.087 | 4.154 | 4.136 | 4.161 | 3.949 |
| ν (Poisson's ratio) | 0.214 | 0.223 | 0.213 | 0.211 | 0.206 | 0.237 |
| Indentation Threshold (kgf) | 32.5 | 42.5 | 32.5 | 22.5 | 32.5 | 12.5 |
| CS (MPa)[1] | | 871.17 | | 826.03 | | |
| CS (MPa)[1] (SOC corrected) | | 854.51 | 794.15 | 808.24 | 842.19 | |
| DOL (μm)[1] | | 48.40 | 46.13 | 47.58 | 47.27 | |
| CS (MPa)[2] | | 996.31 | | 922.73 | | |
| CS (MPa)[2] (SOC corrected) | 716.98 | 977.26 | 865.74 | 902.86 | 915.68 | |
| DOL (μm)[2] | | 38.18 | 38.17 | 38.04 | 38.02 | 38.01 |

| Glass (mol %) | 211 | 212 | 213 | 214 | 215 | 216 | 217 |
|---|---|---|---|---|---|---|---|
| $SiO_2$ | 57.03 | 57.09 | 61.20 | 61.13 | 60.43 | 59.37 | 58.52 |
| $Al_2O_3$ | 18.70 | 18.63 | 16.86 | 16.99 | 17.36 | 17.50 | 17.52 |
| $B_2O_3$ | 5.03 | 5.09 | 5.16 | 5.10 | 5.06 | 5.78 | 6.63 |
| $Na_2O$ | 18.52 | 18.47 | 15.22 | 14.52 | 14.45 | 14.42 | 14.39 |
| $K_2O$ | 0.49 | 0.49 | 1.42 | 2.19 | 2.65 | 2.88 | 2.89 |
| MgO | 0.02 | 0.02 | 0.11 | 0.03 | 0.01 | 0.01 | 0.01 |
| CaO | 0.07 | 0.08 | 0.02 | 0.02 | 0.02 | 0.02 | 0.02 |
| ZnO | | | | | | | |
| $P_2O_5$ | | | | | | | |
| $SnO_2$ | 0.10 | 0.10 | | | | | |
| $[Na_2O] + [K_2O] - [Al_2O_3]$ | 0.31 | 0.34 | -0.22 | -0.27 | -0.26 | -0.19 | -0.23 |
| $[B_2O_3] - ([Na_2O] + [K_2O] - [Al_2O_3])$ | 4.72 | 4.75 | 5.37 | 5.37 | 5.32 | 5.97 | 6.87 |
| Strain Pt. (° C.) | 612 | 609 | 596 | 594 | 595 | 585 | 572 |
| Anneal Pt. (° C.) | 667 | 664 | 654 | 654 | 654 | 641 | 629 |
| Soft Pt. (° C.) | 927 | 928 | 940.1 | 943.9 | 940.9 | 927.1 | 911.7 |
| CTE ($10^{7°}$ $C.^{-1}$) | 94.5 | | 87.7 | 90 | 92.3 | 93.5 | 93.8 |
| Density (g/cm$^3$) | 2.426 | 2.427 | 2.412 | 2.412 | 2.415 | 2.414 | 2.41 |
| E Mod (Mpsi) | 9.683 | 9.687 | 9.807 | 9.616 | 9.664 | 9.693 | 9.631 |
| G Mod (Mpsi) | 3.935 | 3.964 | 3.984 | 4.016 | 4.007 | 3.932 | 3.878 |
| ν (Poisson's ratio) | 0.23 | 0.222 | 0.231 | 0.197 | 0.206 | 0.233 | 0.242 |
| Indentation Threshold (kgf) | 20 | 25 | 27.5 | 27.5 | 27.5 | 32.5 | 27.5 |
| CS (MPa)[1] | | | | | | | |
| CS (MPa)[1] (SOC corrected) | | | | | | | |
| DOL (μm)[1] | | | | | | | |
| CS (MPa)[2] | | | | | | | |
| CS (MPa)[2] (SOC corrected) | | | 1122.4 (16 hr) | 1093.3 (16 hr) | 1125.70 | 1102.90 | 1066.30 |
| DOL (μm)[2] | | | 77.1 (16 hr) | 83.4 (16 hr) | 61.50 | 60.50 | 56.40 |

[1] Glass is fusion drawn/fictivated and ion exchanged at 410° C. for 8 hours in $KNO_3$ molten salt bath.
[2] Glass annealed and ion exchanged at 410° C. for 8 hours in $KNO_3$ molten salt bath.

In a first aspect a glass comprises: from about 50 mol % to about 72 mol % $SiO_2$; from about 12 mol % to about 22 mol % $Al_2O_3$; up to about 6.5 mol % $B_2O_3$; up to about 1 mol % $P_2O_5$; from about 11 mol % to about 21 mol % $Na_2O$; up to about 0.95 mol % $K_2O$; up to about 4 mol % MgO; up to about 5 mol % ZnO; and up to about 2 mol % CaO. In the glass of the first aspect $Na_2O+K_2O—Al_2O_3 \leq 2.0$ mol, $B_2O_3—(Na_2O+K_2O—Al_2O_3)>1$ mol %, 24 mol % $\leq RAlO_4 \leq 45$ mol %, where R is at least one of Na, K, and Ag, and the glass is substantially free of $TiO_2$.

A second aspect includes the glass of the first aspect wherein the glass is substantially free of at least one of $P_2O_5$ and $Li_2O$.

A third aspect includes the glass of the second aspect wherein the glass is substantially free of $Li_2O$.

A fourth aspect includes the glass of the first aspect wherein 56 mol % $\leq SiO_2+B_2O_3 \leq 75$ mol %.

A fifth aspect includes the glass of the first aspect wherein 2 mol % $\leq B_2O_3+P_2O_5 \leq 7.5$ mol %.

A sixth aspect includes the glass of the first aspect wherein the glass is ion exchanged and has a Vickers crack indentation threshold of at least about 9.5 kgf.

A seventh aspect includes the glass of the sixth aspect wherein the glass has a layer under compressive stress CS of greater than about 500 MPa, the layer extending from a surface of the glass to a depth of layer DOL, wherein CS·DOL=44000 MPa·μm.

An eighth aspect includes the glass of the sixth aspect wherein the glass has a compressive stress of greater than about 800 MPa and a depth of layer of at least about 40 μm, and has been ion exchanged for less than about four hours.

A ninth aspect includes the glass of the sixth aspect wherein the glass has a compressive stress of greater than about 800 MPa and a depth of layer of at least about 52 μm, and has been ion exchanged for less than about eight hours.

A tenth aspect includes the glass of the sixth aspect The glass of claim 6, wherein the glass has a compressive stress of greater than about 800 MPa and a depth of layer of at least about 30 μm, and has been ion exchanged for less than about two hours.

An eleventh aspect includes the glass of the first aspect wherein the glass is substantially free of $As_2O_3$ and $Sb_2O_5$.

A twelfth aspect includes the glass of the first aspect wherein the glass further comprises at least one fining agent.

A thirteenth aspect includes the glass of the twelfth aspect wherein the at least one fining agent comprises at least one of $SnO_2$, $CeO_2$, $As_2O_3$, $Sb_2O_5$, $Cl^-$, and $F^-$.

A fourteenth aspect includes the glass of the thirteenth aspect wherein the at least one fining agent comprises at least one of up to about 0.5 mol % $SnO_2$, up to about 0.5 mol % $As_2O_3$, and up to about 0.5 mol % $Sb_2O_3$.

A fifteenth aspect includes the glass of the first aspect wherein the glass comprises: from about 55 mol % to about 62 mol % $SiO_2$; from about 16 mol % to about 20 mol % $Al_2O_3$; from about 2 mol % to about 6.5 mol % $B_2O_3$; up to about 1 mol % $P_2O_5$; from about 14 mol % to about 18 mol % $Na_2O$; from about 0.2 mol % to about 0.75 mol % $K_2O$; up to about 0.5 mol % MgO; up to about 0.5 mol % ZnO; and up to about 0.5 mol % CaO.

A sixteenth aspect includes the glass of the fifteenth aspect wherein $Na_2O+K_2O—Al_2O_3 \leq 0.5$ mol %.

A seventeenth aspect includes the glass of the fifteenth aspect wherein $B_2O_3—(Na_2O+K_2O—Al_2O_3)>4$ mol %.

An eighteenth aspect includes the glass of the fifteenth aspect wherein the glass comprises from about 4 mol % to about 6.5 mol % $B_2O_3$.

A nineteenth aspect includes the glass of the fifteenth aspect wherein the glass has a liquidus viscosity of at least 100 kpoise.

A twentieth aspect includes the glass of the nineteenth aspect wherein the glass is down-drawable.

In a twenty-first aspect a glass comprises: from about 55 mol % to about 62 mol % $SiO_2$; from about 16 mol % to about 20 mol % $Al_2O_3$; from about 4 mol % to about 6.5 mol % $B_2O_3$; from about 14 mol % to about 18 mol % $Na_2O$; from about 0.2 mol % to about 0.75 mol % $K_2O$; up to about 0.5 mol % MgO; up to about 0.5 mol % ZnO; and up to about 0.5 mol % CaO. In the glass of the twenty-first aspect the glass is substantially free of $P_2O_5$, $Na_2O+K_2O—Al_2O_3 \leq 0.5$ mol %, $B_2O_3—(Na_2O+K_2O—Al_2O_3)>4$ mol %, 28 mol % $\leq RAlO_4 \leq 45$ mol %, where R is at least one of Na, K, and Ag, and the glass is substantially free of $TiO_2$.

A twenty-second aspect includes the glass of the twenty-first aspect wherein the glass is substantially free of $Li_2O$.

A twenty-third aspect includes the glass of the twenty-first aspect wherein 56 mol % $\leq SiO_2+B_2O_3 \leq 70$ mol %.

A twenty-fourth aspect includes the glass of the twenty-first aspect wherein 0 mol % $\leq \Sigma[R'O] \leq 0.5$ mol %, where R' is at least one of Ca, Mg, and Zn.

A twenty-fifth aspect includes the glass of the twenty-first aspect wherein $K_2O \leq 0.25(Na_2O+K_2O)$.

A twenty-sixth aspect includes the glass of the twenty-first aspect wherein the glass is substantially free of $As_2O_3$ and $Sb_2O_3$.

A twenty-seventh aspect includes the glass of the twenty-first aspect wherein the glass further comprises at least one fining agent, the fining agent comprising at least one of $SnO_2$, $CeO_2$, $As_2O_3$, and $Sb_2O_5$, $Cl^-$, and $F^-$.

A twenty-eighth aspect includes the glass of the twenty-seventh aspect wherein the at least one fining agent comprises at least one of up to about 0.5 mol % $SnO_2$, up to about 0.5 mol % $As_2O_3$, and up to about 0.5 mol % $Sb_2O_3$.

A twenty-ninth aspect includes the glass of the twenty-first aspect wherein the glass has a liquidus viscosity of at least 100 kpoise.

A thirtieth aspect includes the glass of the twenty-ninth aspect wherein the glass is down-drawable.

A thirty-first aspect includes the glass of the twenty-first aspect wherein the glass is ion exchanged and has a Vickers crack indentation threshold of at least about 9.5 kgf.

A thirty-second aspect includes the glass of the thirty-first aspect wherein the glass has a layer under compressive stress CS of greater than 500 MPa, the layer extending from a surface of the glass to a depth of layer DOL, wherein CS·DOL=44000 MPa·μm.

A thirty-third aspect includes the glass of the thirty-first aspect wherein the glass has a compressive stress of greater than about 800 MPa and a depth of layer of at least about 40 μm, and has been ion exchanged for less than about four hours.

A thirty-fourth aspect includes the glass of the thirty-first aspect wherein the glass has a compressive stress of greater than about 800 MPa and a depth of layer of at least about 52 μm, and has been ion exchanged for less than about eight hours.

A thirty-fifth aspect includes the glass of the thirty-first aspect wherein the glass has a compressive stress of greater than about 800 MPa and a depth of layer of at least about 30 μm, and has been ion exchanged for less than about two hours.

In a thirty-sixth aspect a method of ion exchanging a glass comprises ion exchanging an alkali aluminosilicate glass for up to about eight hours in an ion exchange bath at a temperature of about 410° C. or less, the ion exchange bath comprising a potassium salt and the alkali aluminosilicate glass comprising: from about 50 mol % to about 72 mol % $SiO_2$; from about 12 mol % to about 22 mol % $Al_2O_3$; up to about 6.5 mol % $B_2O_3$; up to about 1 mol % $P_2O_5$; from about 11 mol % to about 21 mol % $Na_2O$; up to about 0.95 mol % $K_2O$; up to about 4 mol % MgO; up to about 5 mol % ZnO; and up to about 1 mol % CaO. The ion exchanged alkali aluminosilicate glass has a compressive layer extending from a surface to a depth of layer DOL, the compressive layer having a compressive stress CS of at least 500 MPa, and the glass is substantially free of $TiO_2$.

A thirty-seventh aspect includes the glass of the thirty-sixth aspect wherein CS·DOL=44000 MPa·μm.

A thirty-eighth aspect includes the glass of the thirty-sixth aspect wherein the glass is ion exchanged to achieve a compressive stress of at least about 800 MPa and a depth of layer of at least about 52 μm within eight hours ion exchange time.

A thirty-ninth aspect includes the glass of the thirty-sixth aspect wherein the glass is ion exchanged to achieve a compressive stress of at least about 800 MPa and a depth of layer of at least about 40 µm within four hours ion exchange time.

A fortieth aspect includes the glass of the thirty-sixth aspect wherein the glass is ion exchanged to achieve a compressive stress of at least about 800 MPa and a depth of layer of at least about 30 µm within two hours ion exchange time.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A glass, comprising:
   from 50 mol % to 72 mol % $SiO_2$;
   from 12 mol % to 22 mol % $Al_2O_3$;
   up to 6.5 mol % $B_2O_3$;
   up to 1 mol % $P_2O_5$;
   from 11 mol % to 21 mol % $Na_2O$;
   greater than 0.0 to 0.26 mol % $K_2O$;
   up to 4 mol % MgO;
   up to 5 mol % ZnO; and
   up to 2 mol % CaO, wherein:
   $Na_2O+K_2O—Al_2O_3 \leq 2.0$ mol %,
   $B_2O_3—(Na_2O+K_2O—Al_2O_3) > 1$ mol %,
   the glass is substantially free of $TiO_2$,
   the glass is ion exchanged and has a Vickers crack indentation threshold of at least 17.5 kgf, and
   the glass has a layer under compressive stress CS, the layer extending from a surface of the glass to a depth of layer DOL, and the DOL is >55.27 µm.

2. The glass of claim 1, wherein the glass is substantially free of at least one of $P_2O_5$ and $Li_2O$.

3. The glass of claim 1, wherein the glass is substantially free of $Li_2O$.

4. The glass of claim 1, wherein 56 mol % $\leq SiO_2+B_2O_3 \leq 75$ mol %.

5. The glass of claim 1, wherein the glass has a layer under compressive stress CS of greater than 500 MPa, the layer extending from a surface of the glass to a depth of layer DOL, wherein CS·DOL>44000 MPa·µm.

6. The glass of claim 1, wherein the glass is substantially free of $As_2O_3$ and $Sb_2O_3$.

7. The glass of claim 1, wherein the glass further comprises one or more of: from >0 mol % to 0.5 mol % $SnO_2$, from >0 mol % to 0.5 mol % $As_2O_3$, from >0 mol % to 0.5 mol % $Sb_2O_3$, or combinations thereof.

8. The glass of claim 1, wherein the glass has a liquidus viscosity of at least 100 kpoise.

9. The glass of claim 1, wherein the glass has a Vickers crack indentation threshold of less than or equal to 50.0 kgf.

10. A glass, comprising:
    from 50 mol % to 72 mol % $SiO_2$;
    from 12 mol % to 22 mol % $Al_2O_3$;
    up to 6.5 mol % $B_2O_3$;
    up to 1 mol % $P_2O_5$;
    from 11 mol % to 21 mol % $Na_2O$;
    greater than 0.0 to 0.26 mol % $K_2O$;
    up to 4 mol % MgO;
    up to 5 mol % ZnO; and
    up to 2 mol % CaO, wherein:
    the glass is substantially free of $P_2O_5$,
    $Na_2O+K_2O—Al_2O_3 \leq 2.0$ mol %,
    $B_2O_3—(Na_2O+K_2O—Al_2O_3) > 1$ mol %,
    the glass is substantially free of $TiO_2$,
    the glass is ion exchanged and has a Vickers crack indentation threshold of at least 17.5 kgf, and
    the glass has a layer under compressive stress CS, the layer extending from a surface of the glass to a depth of layer DOL, and the DOL is $\geq 55.27$ µm.

11. The glass of claim 10, wherein the glass is substantially free of $Li_2O$.

12. The glass of claim 10, wherein 56 mol % $\leq SiO_2+B_2O_3 \leq 70$ mol %.

13. The glass of claim 10, wherein 0 mol % $\leq \Sigma[R'] \leq 0.5$ mol %, where R' is at least one of Ca, Mg, and Zn.

14. The glass of claim 10, wherein the glass is substantially free of $As_2O_3$ and $Sb_2O_3$.

15. The glass of claim 10, wherein the glass further comprises one or more of: from >0 mol % to 0.5 mol % $SnO_2$, from >0 mol % to 0.5 mol % $As_2O_3$, from >0 mol % to 0.5 mol % $Sb_2O_3$, or combinations thereof.

16. The glass of claim 10, wherein the glass has a liquidus viscosity of at least 100 kpoise.

17. The glass of claim 10, wherein the glass has a layer under compressive stress CS of greater than 500 MPa, the layer extending from a surface of the glass to a depth of layer DOL, wherein CS·DOL>44000 MPa·µm.

18. The glass of claim 10, wherein the glass comprises from 4 mol % to 6.0 mol % $B_2O_3$.

19. The glass of claim 10, wherein the glass has a Vickers crack indentation threshold of less than or equal to 50.0 kgf.

* * * * *

UNITED STATES PATENT AND TRADEMARK OFFICE
CERTIFICATE OF CORRECTION

PATENT NO. : 10,858,281 B2
APPLICATION NO. : 15/986402
DATED : December 8, 2020
INVENTOR(S) : Matthew John Dejneka et al.

Page 1 of 1

It is certified that error appears in the above-identified patent and that said Letters Patent is hereby corrected as shown below:

In the Claims

In Column 41, Line 36, Claim 1, delete ">" and insert -- $\geq$ --, therefor.

In Column 41, Line 46, Claim 5, delete ">" and insert -- $\geq$ --, therefor.

In Column 42, Line 31, Claim 13, delete "[R']" and insert -- [R'O] --, therefor.

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*